US012754405B2

(12) United States Patent
Kageyama

(10) Patent No.: US 12,754,405 B2
(45) Date of Patent: Oct. 6, 2026

(54) PROJECTION OPTICAL SYSTEM AND PROJECTOR

(71) Applicant: SEIKO EPSON CORPORATION, Tokyo (JP)

(72) Inventor: Akihisa Kageyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 281 days.

(21) Appl. No.: 18/619,771

(22) Filed: Mar. 28, 2024

(65) Prior Publication Data

US 2024/0329366 A1 Oct. 3, 2024

(30) Foreign Application Priority Data

Mar. 29, 2023 (JP) ................................ 2023-052980

(51) Int. Cl.
*G02B 15/14* (2006.01)
*G02B 13/00* (2006.01)
*G02B 13/02* (2006.01)
*G03B 21/20* (2006.01)

(52) U.S. Cl.
CPC ..... *G02B 15/1465* (2019.08); *G02B 13/0045* (2013.01); *G02B 13/009* (2013.01); *G02B 13/02* (2013.01); *G03B 21/208* (2013.01)

(58) Field of Classification Search
CPC ................................................. G02B 15/1465
USPC .......................................................... 359/681
See application file for complete search history.

(56) References Cited

U.S. PATENT DOCUMENTS 10,216,072 B2 2/2019 Takahashi
2014/0240554 A1* 8/2014 Uchida .............. G02B 15/1461 348/240.99
2019/0064491 A1* 2/2019 Sugita ................ G02B 15/1461
2021/0349293 A1* 11/2021 Uehara .............. G02B 15/1441
2025/0067964 A1* 2/2025 Ono ....................... G02B 13/18

FOREIGN PATENT DOCUMENTS

JP 2019-015830 A 1/2019

* cited by examiner

*Primary Examiner* — Darryl J Collins
(74) *Attorney, Agent, or Firm* — Oliff PLC

(57) ABSTRACT

A projection optical system includes first through ninth lens groups, and these lens groups are in an order from a magnification side to a reduction side. The projection optical system includes an aperture stop between the second lens group and the eighth lens group. The first lens group has negative power and includes one first aspherical lens. Any one of the second, the third, the fourth, the fifth, the sixth, the seventh, the eighth, and the ninth lens groups includes at least one second aspherical lens. During zooming, the first lens group and the ninth lens group are fixed, and the second lens group, the third lens group, the fourth lens group, the fifth lens group, the sixth lens group, the seventh lens group, and the eighth lens group move.

16 Claims, 26 Drawing Sheets

PROJECTION OPTICAL SYSTEM AND PROJECTOR

The present application is based on, and claims priority from JP Application Serial Number 2023-052980, filed Mar. 29, 2023, the disclosure of which is hereby incorporated by reference herein in its entirety.

BACKGROUND

1. Technical Field

The present disclosure relates to a projection optical system and a projector.

2. Related Art

A projector that enlarges, by a projection optical system, a projection image displayed on an image display element and projects the enlarged projection image on a screen is disclosed in JP-A-2019-015830. The projection optical system in the document includes, in an order from a magnification side, a first lens unit having negative power, a second lens unit, a third lens unit, a fourth lens unit, a fifth lens unit, a sixth lens unit, a seventh lens unit, and an eighth lens unit having positive power. During zooming, the second lens unit to the seventh lens unit move. The first lens unit includes two aspherical lenses. A zoom ratio of the projection optical system is about 1.31 to 1.76. A total lens length of the projection optical system is 220 mm.

JP-A-2019-015830 is an example of the related art.

The projection optical system in JP-A-2019-015830 prevents various aberrations while achieving a high zoom ratio and a reduction in a total lens length. However, the projection optical system in the document has a problem that it is difficult to ensure sufficient resolution performance over the entire zoom range. Therefore, as a projection optical system having a high zoom ratio, a projection optical system having a shorter total lens length while ensuring sufficient resolution performance over the entire zoom range is demanded.

SUMMARY

In order to solve the above problems, a projection optical system according to the present disclosure includes: a first lens group; a second lens group; a third lens group; a fourth lens group; a fifth lens group; a sixth lens group; a seventh lens group; an eighth lens group; and a ninth lens group, these lens groups being in an order from a magnification side to a reduction side; and an aperture stop disposed between the second lens group and the eighth lens group. The first lens group has negative power and includes one first aspherical lens. Any one of the second lens group, the third lens group, the fourth lens group, the fifth lens group, the sixth lens group, the seventh lens group, the eighth lens group, and the ninth lens group includes at least one second aspherical lens. During zooming, the first lens group and the ninth lens group are fixed, and the second lens group, the third lens group, the fourth lens group, the fifth lens group, the sixth lens group, the seventh lens group, and the eighth lens group move.

Next, a projector according to the present disclosure includes the above-described projection optical system, and an image forming element configured to form a projection image on a reduction side conjugate plane of the projection optical system.

DESCRIPTION OF EMBODIMENTS

A projection optical system and a projector according to embodiments of the present disclosure will be described below with reference to the drawings.

Projector

Figure 1:
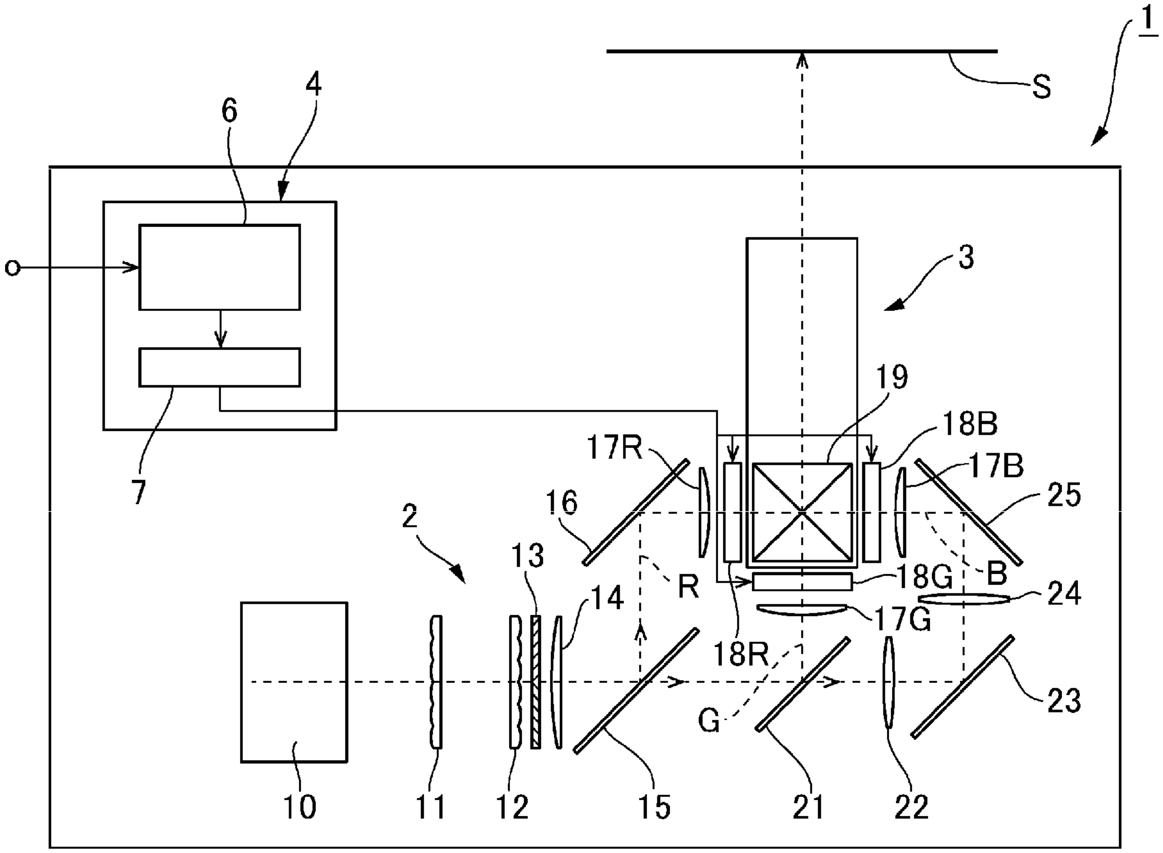
FIG. 1 is a diagram showing a schematic configuration of a projector including a projection optical system according to the present disclosure.

FIG. 1 is a diagram showing a schematic configuration of a projector including a projection optical system 3 according to the present disclosure. As shown in FIG. 1, the projector 1 includes an image forming unit 2 that generates a projection image to be projected onto a screen S, the projection optical system 3 that enlarges the projection image and projects the enlarged image onto the screen S, and a control unit 4 that controls an operation of the image forming unit 2.

Image Forming Unit and Control Unit

The image forming unit 2 includes a light source 10, a first integrator lens 11, a second integrator lens 12, a polarization conversion element 13, and a superimposing lens 14. The light source 10 includes, for example, an ultra-high pressure mercury lamp or a solid light source. Each of the first integrator lens 11 and the second integrator lens 12 includes a plurality of lens elements arranged in an array. The first integrator lens 11 divides a light beam from the light source 10 into a plurality of parts. The lens elements of the first integrator lens 11 condense the light beam from the light source 10 to a vicinity of the lens elements of the second integrator lens 12.

The polarization conversion element 13 converts light from the second integrator lens 12 into predetermined linearly polarized light. The superimposing lens 14 superimposes images of the lens elements of the first integrator lens 11 on display areas of a liquid crystal panel 18R, a liquid crystal panel 18G, and a liquid crystal panel 18B to be described later, via the second integrator lens 12.

The image forming unit 2 also includes a first dichroic mirror 15, a reflection mirror 16, a field lens 17R, and the liquid crystal panel 18R. The first dichroic mirror 15 reflects R light that is a part of rays incident from the superimposing lens 14 and transmits G light and B light that are a part of the rays incident from the superimposing lens 14. The R light reflected by the first dichroic mirror 15 enters the liquid crystal panel 18R through the reflection mirror 16 and the field lens 17R. The liquid crystal panel 18R is an image forming element. The liquid crystal panel 18R forms a red projection image by modulating the R light according to an image signal.

The image forming unit 2 further includes a second dichroic mirror 21, a field lens 17G, and a liquid crystal panel 18G. The second dichroic mirror 21 reflects the G light that is a part of rays from the first dichroic mirror 15, and transmits the B light that is a part of rays from the first dichroic mirror 15. The G light reflected by the second dichroic mirror 21 enters the liquid crystal panel 18G through the field lens 17G. The liquid crystal panel 18G is an image forming element. The liquid crystal panel 18G forms a green projection image by modulating the G light according to an image signal.

The image forming unit 2 also includes a relay lens 22, a reflection mirror 23, a relay lens 24, a reflection mirror 25, a field lens 17B, a liquid crystal panel 18B, and a cross dichroic prism 19. The B light transmitted through the second dichroic mirror 21 enters the liquid crystal panel 18B through the relay lens 22, the reflection mirror 23, the relay lens 24, the reflection mirror 25, and the field lens 17B. The liquid crystal panel 18B is an image forming element. The liquid crystal panel 18B forms a blue projection image by modulating the B light according to an image signal.

The liquid crystal panel 18R, the liquid crystal panel 18G, and the liquid crystal panel 18B surround the cross dichroic prism 19 from three directions. The cross dichroic prism 19 is a prism for light synthesis and generates a projection image by synthesizing the light modulated by the liquid crystal panels 18R, 18G, and 18B.

The projection optical system 3 enlarges the projection image synthesized by the cross dichroic prism 19 and projects the enlarged projection image onto the screen S.

The control unit 4 includes an image processing unit 6 to which an external image signal such as a video signal is input, and a display driving unit 7 that drives the liquid crystal panel 18R, the liquid crystal panel 18G, and the liquid crystal panel 18B based on an image signal output from the image processing unit 6.

The image processing unit 6 converts an image signal received from an external device into an image signal including gradation of each color. The display driving unit 7 operates the liquid crystal panel 18R, the liquid crystal panel 18G, and the liquid crystal panel 18B based on projection image signals of colors output from the image processing unit 6. Accordingly, the image processing unit 6 displays projection images corresponding to the image signals on the liquid crystal panel 18R, the liquid crystal panel 18G, and the liquid crystal panel 18B.

Projection Optical System

Next, the projection optical system 3 will be described. As shown in FIG. 1, the screen S is disposed on a magnification side conjugate plane of the projection optical system 3. The liquid crystal panel 18R, the liquid crystal panel 18G, and the liquid crystal panel 18B are disposed on a reduction side conjugate plane of the projection optical system 3.

Hereinafter, first to fifth embodiments will be described as configuration examples of the projection optical system 3 mounted on the projector 1.

First Embodiment

Figure 2:
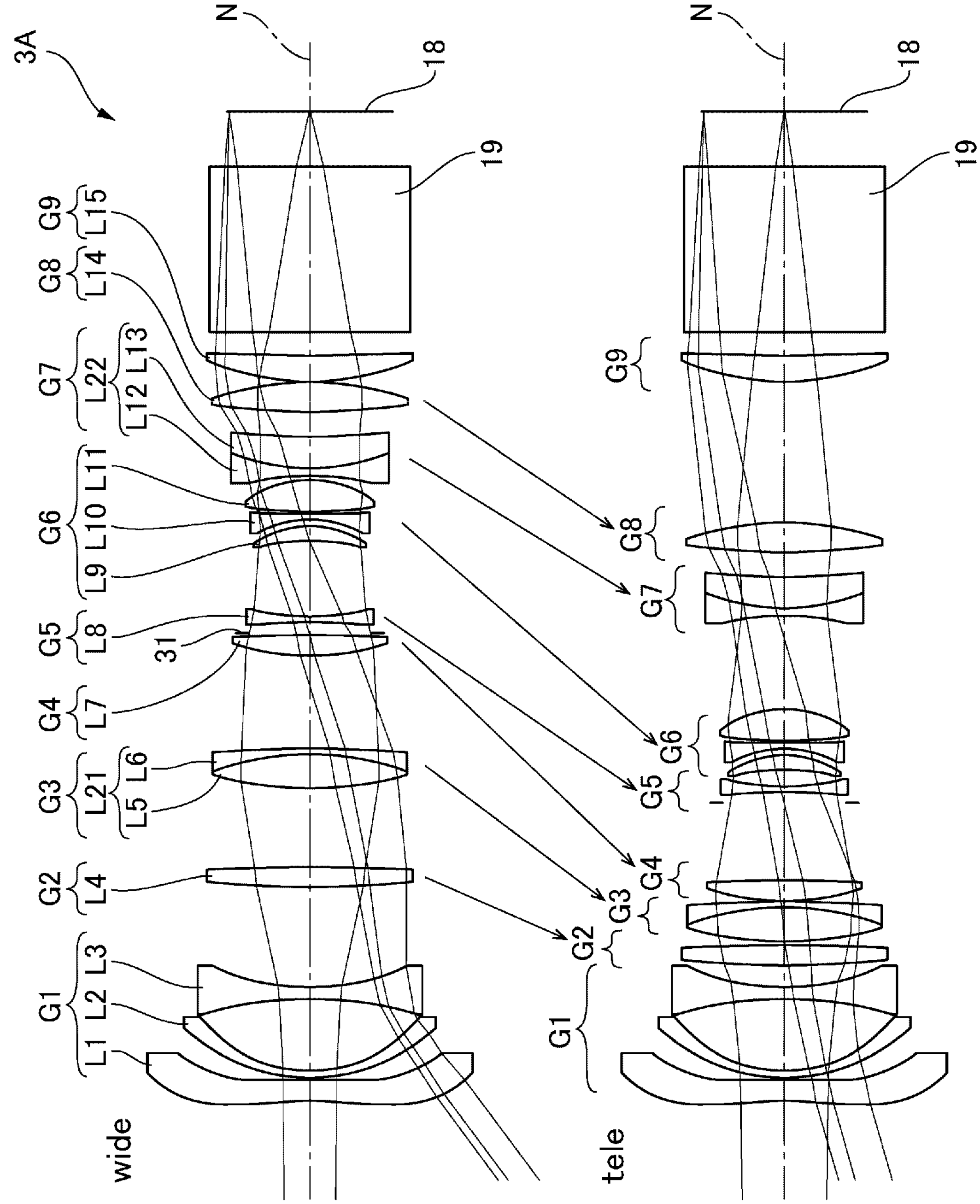
FIG. 2 is a ray diagram of a projection optical system according to a first embodiment.

As shown in FIG. 2, a projection optical system 3A includes, in an order from a magnification side to a reduction side, a first lens group G1 having negative power, a second lens group G2 having positive power, a third lens group G3 having positive power, a fourth lens group G4 having positive power, a fifth lens group G5 having negative power, a sixth lens group G6 having positive power, a seventh lens group G7 having negative power, an eighth lens group G8 having positive power, and a ninth lens group G9 having positive power. The projection optical system 3A includes an aperture stop 31 disposed between the fourth lens group G4 and the fifth lens group G5.

The first lens group G1 includes three lenses L1 to L3. The lenses L1 to L3 are disposed in this order from the magnification side toward the reduction side. The lens L1 is made of resin. The lens L1 has negative power. The lens L2 has negative power. The lens L2 is a meniscus lens. The lens L2 has a convex shape on a magnification side surface thereof and a concave shape on a reduction side surface thereof. The lens L3 has negative power. The lens L3 has concave shapes on magnification side and reduction side surfaces thereof.

The second lens group G2 includes one lens L4. The lens L4 has positive power. The lens L4 has convex shapes on magnification side and reduction side surfaces thereof. The third lens group G3 includes two lenses L5 to L6. The lenses L5 to L6 are disposed in this order from the magnification side to the reduction side. The lens L5 (positive lens, first lens) has positive power. The lens L5 has convex shapes on magnification side and reduction side surfaces thereof. The lens L6 (negative lens, second lens) has negative power. The lens L6 is a meniscus lens. The lens L6 has a concave shape on a magnification side surface thereof and a convex shape on a reduction side surface thereof. The lens L5 and the lens L6 are cemented to form a cemented lens L21. The fourth lens group G4 includes one lens L7. The lens L7 has positive power. The lens L7 has convex shapes on magnification side and reduction side surfaces thereof.

The fifth lens group G5 includes one lens L8. The lens L8 has negative power. The lens L8 has concave shapes on magnification side and reduction side surfaces thereof.

The sixth lens group G6 includes three lenses L9 to L11. The lenses L9 to L11 are disposed in this order from the magnification side toward the reduction side. The lens L9 has positive power. The lens L9 is a meniscus lens. The lens L9 has a concave shape on a magnification side surface thereof and a convex shape on a reduction side surface thereof. The lens L10 has negative power. The lens L10 has concave shapes on magnification side and reduction side surfaces thereof. The lens L11 has positive power. The lens L11 has convex shapes on magnification side and reduction side surfaces thereof.

The seventh lens group G7 includes two lenses L12 to L13. The lenses L12 to L13 are disposed in this order from the magnification side toward the reduction side. The lens L12 has negative power. The lens L12 has concave shapes on magnification side and reduction side surfaces thereof. The lens L13 has positive power. The lens L13 is a meniscus lens. The lens L14 has a convex shape on a magnification side surface thereof and a concave shape on a reduction side surface thereof. The lens L12 and the lens L13 are cemented to form the cemented lens L22.

The eighth lens group G8 includes one lens L14. The lens L14 has positive power. The lens L14 has convex shapes on magnification side and reduction side surfaces thereof. The ninth lens group G9 includes one lens L15. The lens L15 has positive power. The lens L15 is a meniscus lens. The lens L15 has a convex shape on a magnification side surface thereof and a concave shape on a reduction side surface thereof.

Here, the lens L1 (first aspherical lens) and the lens L9 (second aspherical lens) are aspherical lenses having aspherical shapes on magnification side and reduction side surfaces thereof. The lenses L2 to L8 and L10 to L15 are spherical lenses having spherical shapes on magnification side and reduction side surfaces thereof.

In the projection optical system 3A, the reduction side with respect to the lens L15 of the ninth lens group G9 is telecentric. The term "telecentric" means that a central ray of each light beam passing between the lens L15 and the liquid crystal panel 18 that is disposed on the reduction side conjugate plane is parallel to an optical axis or substantially parallel to the optical axis. In this specification, the term telecentric means that an angle formed between the central ray of each light beam and an optical axis N of the projection optical system 3A is within ±5°.

The projection optical system 3A is a zoom lens and changes an angle of view between a wide-angle end and a telephoto end. In the projection optical system 3A, during zooming, the first lens group G1 and the ninth lens group G9 are fixed, and the second lens group G2, the third lens group G3, the fourth lens group G4, the fifth lens group G5, the sixth lens group G6, the seventh lens group G7, and the eighth lens group G8 move along the optical axis N. The second lens group G2, the third lens group G3, the fourth lens group G4, the fifth lens group G5, the sixth lens group G6, the seventh lens group G7, and the eighth lens group G8 each move from the reduction side to the magnification side along the optical axis N when zooming from the wide-angle end to the telephoto end. In the embodiment, a zoom ratio is about 2.50.

When an F number of the projection optical system 3A is FNo, a focal length of the entire system at the wide-angle end is Fw, a focal length of the entire system at the telephoto end is Ft, a reciprocal of the focal length of the entire system at the wide-angle end is Φw, a zoom ratio is Z, a back focus is BF, a total lens length (a distance from an object side surface of the lens L1 to a reduction side surface of the lens L15) is LL, a maximum image height of the liquid crystal panel 18 is IH, a reciprocal of a composite focal length of all the lenses (the seven lenses L1 to L7), which are disposed on the magnification side with respect to the aperture stop 31, at the wide-angle end is Φ1, a focal length of the fifth lens group G5 having negative power and disposed at a position closest to the aperture stop 31 is Fgs, a reciprocal of a focal length of the first lens group G1 is Φg1, a reciprocal of a focal length of the second lens group G2 is Φg2, and a reciprocal of a focal length of the third lens group G3 is Φg3, data on the projection optical system 3A is as follows.

| FNo (wide-angle end to telephoto end) | 2.12-3.32 |
|---|---|
| Fw | 23.520(mm) |
| Ft | 58.800(mm) |
| Φw | 0.0425(1/mm) |
| Z | 2.500 |
| BF | 52.470(mm) |
| LL | 160.000(mm) |
| IH | 16.850(mm) |
| Φ1 | 0.0480(1/mm) |
| Fgs | −60.37(mm) |
| Φg1 | −0.036(1/mm) |
| Φg2 | 0.005(1/mm) |
| Φg3 | 0.013(1/mm) |

Lens data on the projection optical system 3A is as follows. Surface numbers are assigned in an order from the magnification side to the reduction side. Reference numerals are those of the screen, the lens, the dichroic prism, and the liquid crystal panel. A surface whose surface number is attached with * is an aspherical surface. R is a radius of curvature. Dis an axial surface interval. Nd is a refractive index of a d-line. Vd is an Abbe number of the d-line. A unit of R and D is mm.

| Reference numeral | Surface number | R | D | Nd | Vd |
|---|---|---|---|---|---|
| S | 0 | 1.00E+18 | 2540.0000 | | |
| L01 | 1* | −43.1412 | 4.3897 | 1.53504 | 55.711 |
| | 2* | −85.8857 | 0.4000 | | |
| L02 | 3 | 37.6842 | 1.5000 | 1.49700 | 81.546 |
| | 4 | 28.5510 | 15.3614 | | |
| L03 | 5 | −72.3712 | 2.5000 | 1.60311 | 60.641 |
| | 6 | 46.4675 | Variable interval 1 | | |
| L04 | 7 | 240.6299 | 4.2011 | 1.84666 | 23.778 |
| | 8 | −596.0878 | Variable interval 2 | | |
| L05 | 9 | 70.9052 | 7.3944 | 1.80100 | 34.967 |
| L06 | 10 | −55.6501 | 1.2000 | 1.84666 | 23.778 |
| | 11 | −300.6849 | Variable interval 3 | | |
| L07 | 12 | 46.7562 | 4.5568 | 1.65412 | 39.683 |
| | 13 | −191.5871 | Variable interval 4 | | |
| 31 | 14 | 1.00E+18 | 0.2085 | | |
| | 15 | 1.00E+18 | 2.3669 | | |
| L08 | 16 | −127.8848 | 1.2000 | 1.53172 | 48.841 |
| | 17 | 43.2454 | Variable interval 5 | | |
| L09 | 18* | −66.5347 | 3.1094 | 1.58313 | 59.386 |
| | 19* | −23.4429 | 1.5000 | | |
| L10 | 20 | −22.0001 | 1.2000 | 1.69895 | 30.128 |
| | 21 | 251.3803 | 0.4550 | | |
| L11 | 22 | 81.8899 | 6.9907 | 1.49700 | 81.546 |
| | 23 | −21.2831 | Variable interval 6 | | |
| L12 | 24 | −50.1668 | 1.5658 | 1.76182 | 26.518 |
| L13 | 25 | 42.0341 | 6.8173 | 1.49700 | 81.546 |
| | 26 | 140.3101 | Variable interval 7 | | |
| L14 | 27 | 128.1153 | 6.4154 | 1.80810 | 22.761 |
| | 28 | −60.3395 | Variable interval 8 | | |
| L15 | 29 | 52.0558 | 5.6052 | 1.49700 | 81.546 |
| | 30 | 351.9944 | 5.1000 | | |
| 19 | 31 | 1.00E+18 | 35.5400 | 1.51680 | 64.198 |
| | 32 | 1.00E+18 | 0.0000 | | |
| 18 | 33 | 1.00E+18 | 11.8300 | | |

The variable interval 1, the variable interval 2, the variable interval 3, the variable interval 4, the variable interval 5, the variable interval 6, the variable interval 7, and the variable interval 8 during zooming are shown below. The variable interval 1 is an interval between the first lens group G1 and the second lens group G2, the variable interval 2 is an interval between the second lens group G2 and the third lens group G3, the variable interval 3 is an interval between the third lens group G3 and the fourth lens group G4, the variable interval 4 is an interval between the fourth lens group G4 and the fifth lens group G5, the variable interval 5 is an interval between the fifth lens group G5 and the sixth lens group G6, the variable interval 6 is an interval between the sixth lens group G6 and the seventh lens group G7, the variable interval 7 is an interval between the seventh lens group G7 and the eighth lens group G8, and the variable interval 8 is an interval between the eighth lens group G8 and the ninth lens group G9.

| | Wide-angle end | Telephoto end |
|---|---|---|
| Variable interval 1 | 21.5478 | 4.7430 |
| Variable interval 2 | 15.9650 | 0.1000 |
| Variable interval 3 | 20.0000 | 0.4000 |
| Variable interval 4 | 2.6754 | 18.8503 |
| Variable interval 5 | 16.2932 | 3.6538 |

-continued

| | Wide-angle end | Telephoto end |
|---|---|---|
| Variable interval 6 | 0.8000 | 20.2309 |
| Variable interval 7 | 5.2565 | 5.0074 |
| Variable interval 8 | 0.1000 | 29.6525 |

Each aspherical coefficient is as follows.

| Surface number | 1 | 2 |
|---|---|---|
| R | −43.1412 | −85.8857 |
| Conic constant (K) | −18.0115 | −90.7867 |
| 4th-order coefficient | 2.178198E−05 | 2.695992E−05 |
| 6th-order coefficient | −3.217284E−08 | −3.243090E−08 |
| 8th-order coefficient | 3.471732E−11 | 1.168011E−11 |
| 10th-order coefficient | −2.063754E−14 | 3.838667E−14 |
| 12th-order coefficient | 5.501801E−18 | −5.590066E−17 |
| 14th-order coefficient | 1.686234E−22 | 2.626962E−20 |

| Surface number | 18 | 19 |
|---|---|---|
| R | −66.5347 | −23.4429 |
| Conic constant (K) | −99.0000 | −0.6147 |
| 4th-order coefficient | −6.568855E−05 | −1.344448E−05 |
| 6th-order coefficient | 2.350959E−07 | −1.060055E−07 |
| 8th-order coefficient | −2.575678E−09 | 4.035299E−10 |
| 10th-order coefficient | 9.010406E−12 | −4.860644E−12 |
| 12th-order coefficient | −3.445756E−14 | |

Here, the projection optical system 3A according to the embodiment satisfies the following conditional expression in which Φ1 is the reciprocal of the composite focal length (the seven lenses L1 to L7) of all the lenses, which are disposed on the magnification side with respect to the aperture stop 31, at the wide-angle end, and Φw is the reciprocal of the focal length of the entire system at the wide-angle end.

$$0.1 < \Phi 1/\Phi w < 1.3 \quad (1)$$

In the embodiment, variables are as below.

| | |
|---|---|
| Φ1 | 0.0480 (1/mm) |
| Φw | 0.0425 (1/mm) |

Therefore, Φ1/Φw=1.129, which satisfies the conditional expression (1).

The projection optical system 3A according to the embodiment satisfies the following conditional expression, in which Fgs is the focal length of the fifth lens group G5 having negative power and disposed at the position closest to the aperture stop 31, and Fw is the focal length of the entire system at the wide-angle end.

$$-9.5 < Fgs/Fw < 0 \quad (2)$$

In the embodiment, variables are as below.

| | |
|---|---|
| Fgs | −60.37 (mm) |
| Fw | 23.520 (mm) |

Therefore, Fgs/Fw=−2.567, which satisfies the conditional expression (2).

The projection optical system 3A according to the embodiment satisfies the following conditional expression, in which Fw is the focal length of the entire system at the wide-angle end, Ft is the focal length of the entire system at the telephoto end, LL is the total lens length, and IH is the maximum image height of the liquid crystal panel 18.

$$2.7 < (LL/IH)/(Ft/Fw) < 4.5 \quad (3)$$

In the embodiment, variables are as below.

| | |
|---|---|
| Fw | 23.520 (mm) |
| Ft | 58.800 (mm) |
| LL | 160.000 (mm) |
| IH | 16.850 (mm) |

Therefore, (LL/IH)/(Ft/Fw)=3.798, which satisfies the conditional expression (3).

The projection optical system 3A according to the embodiment satisfies the following conditional expression in which Φw is the reciprocal of the focal length of the entire system at the wide-angle end, and Φg1 is the reciprocal of the focal length of the first lens group G1.

$$-1.0 < \Phi g1/\Phi w < -0.5 \quad (4)$$

In the embodiment, variables are as below.

| | |
|---|---|
| Φw | 0.0425 (1/mm) |
| Φg1 | −0.036 (1/mm) |

Therefore, Φg1/Φw=−0.85, which satisfies the conditional expression (4).

The projection optical system 3A according to the embodiment satisfies the following conditional expression in which Φw is the reciprocal of the focal length of the entire system at the wide-angle end, and Φg2 is the reciprocal of the focal length of the second lens group G2.

$$-1.0 < \Phi g2/\Phi w < 0.6 \quad (5)$$

In the embodiment, variables are as below.

| | |
|---|---|
| Φw | 0.0425 (1/mm) |
| Φg2 | 0.005 (1/mm) |

Therefore, Φg2/Φw=0.117, which satisfies the conditional expression (5).

The third lens group G3 includes the lens L5 (positive lens) having positive power and the lens L6 (negative lens) having negative power. The projection optical system 3A according to the embodiment satisfies the following conditional expression in which Φg2 is the reciprocal of the focal length of the second lens group G2, and Φg3 is the reciprocal of the focal length of the third lens group G3.

$$-1.0 < \Phi g2/\Phi g3 < 1.7 \quad (6)$$

In the embodiment, variables are as below.

| | |
|---|---|
| Φg2 | 0.005 (1/mm) |
| Φg3 | 0.013 (1/mm) |

Therefore, Φg2/Φg3=0.376, which satisfies the conditional expression (6).

The projection optical system 3A according to the embodiment includes the cemented lens L21 which includes the lens L5 (first lens) having positive power and the lens L6 (second lens) having negative power and which is disposed on the magnification side with respect to the aperture stop 31. The projection optical system 3A according to the embodiment satisfies the following conditional expression, in which Nd1 is a refractive index of the lens L5, Nd2 is a refractive index of the lens L6, Vd1 is an Abbe number of a d-line of the lens L5, and Vd2 is an Abbe number of a d-line of the lens L6.

$$7 < |(Nd1 \times Vd1) - (Nd2 \times Vd2)| < 28 \quad (7)$$

In the embodiment, variables are as below.

| | |
|---|---|
| Nd1 | 1.801 |
| Nd2 | 1.847 |
| Vd1 | 34.967 |
| Vd2 | 23.778 |

Therefore, |(Nd1×Vd1)−(Nd2×Vd2)|=19.067, which satisfies the conditional expression (7).

The projection optical system 3A according to the embodiment satisfies the following conditional expression, in which Nd2 is the refractive index of the lens L6 (second lens).

$$Nd2 < 1.85 \quad (8)$$

In the embodiment, Nd2=1.847, which satisfies the conditional expression (8).

Effects

The projection optical system 3A according to the embodiment includes, in the order from the magnification side to the reduction side, the first lens group G1, the second lens group G2, the third lens group G3, the fourth lens group G4, the fifth lens group G5, the sixth lens group G6, the seventh lens group G7, the eighth lens group G8, and the ninth lens group G9. The projection optical system 3A includes an aperture stop 31 disposed between the fourth lens group G4 and the fifth lens group G5. The first lens group G1 has negative power and includes the lens L1 that is one first aspherical lens. The sixth lens group G6 includes one second aspherical lens. During zooming, the first lens group G1 and the ninth lens group G9 are fixed, and the second lens group G2, the third lens group G3, the fourth lens group G4, the fifth lens group G5, the sixth lens group G6, the seventh lens group G7, and the eighth lens group G8 move.

According to the embodiment, since seven lens groups move during zooming, the projection optical system 3A has a compact total lens length while ensuring sufficient resolution performance over the entire zoom range.

Here, as a comparative example, a third embodiment in JP-A-2019-015830, which is a related-art document, will be compared with the projection optical system 3A according to the embodiment. A projection optical system according to the comparative example includes, in an order from a magnification side, a first lens unit having negative power, a second lens unit, a third lens unit, a fourth lens unit, a fifth lens unit, a sixth lens unit, a seventh lens unit, and an eighth lens unit having positive power. During zooming, six lens units including the second lens unit to the seventh lens unit move. Data of the comparative example is as follows.

| | |
|---|---|
| Z | 1.760 |
| LL | 220.000 mm |

Comparing the projection optical system 3A according to the embodiment with the projection optical system according to the comparative example, the projection optical system 3A according to the embodiment has a higher zoom ratio than the projection optical system according to the comparative example. The projection optical system 3A according to the embodiment has a shorter total lens length than the projection optical system according to the comparative example. Accordingly, the projection optical system 3A according to the embodiment can achieve a higher zoom ratio and make the total lens length more compact than the projection optical system according to the comparative example.

In the projection optical system 3A according to the embodiment, during zooming from the wide-angle end to the telephoto end, the second lens group G2, the third lens group G3, the fourth lens group G4, the fifth lens group G5, the sixth lens group G6, the seventh lens group G7, and the eighth lens group G8 each move from the reduction side to the magnification side. Therefore, only the second lens group G2 to the eighth lens group G8 move in the same direction during zooming, and thus a structure of a lens barrel for holding the projection optical system 3A can be simplified.

In the projection optical system 3A according to the embodiment, the third lens group G3 and the eighth lens group G8 have positive power. Therefore, various aberrations occurring in the first lens group G1 having negative power can be favorably corrected by the third lens group G3 having positive power. Since the eighth lens group G8 has positive power, it is easy to make the reduction side of the projection optical system 3A telecentric.

The projection optical system 3A according to the embodiment includes the aperture stop 31 disposed between the fourth lens group G4 and the fifth lens group G5. Therefore, the aperture stop 31 can favorably correct various aberrations while appropriately ensuring a peripheral light amount of rays passing through the projection optical system 3A.

In the projection optical system 3A according to the embodiment, the sixth lens group G6 includes the lens L9 that is one second aspherical lens. Here, since the sixth lens group G6 is close to the aperture stop 31, a width of a light beam passing through the lens L9 is small. Therefore, since an effective radius of the lens L9 is small, an outer diameter dimension of the lens L9 can be reduced. Accordingly, a cost of manufacturing the aspherical lens can be reduced. Since the lens L9 is disposed at a position close to the aperture stop 31, it is easy to favorably improve various aberrations, particularly, a spherical aberration and a coma aberration. Accordingly, optical performance of the projection optical system 3A can be improved. Since the lens L9 is disposed at a position close to the aperture stop 31, various aberrations can be favorably improved even when the projection optical system 3A is reduced in size and an amount of movement of the lens group during zooming is small.

Since one second aspherical lens is provided, a manufacturing cost can be reduced as compared with a case where two or more second aspherical lenses are provided. It is easy to dispose each lens when assembling the projection optical system 3A.

None of the second lens group G2, the third lens group G3, the seventh lens group G7, the eighth lens group G8, and the ninth lens group G9 includes the second aspherical lens. That is, these lens groups include only spherical lenses. Therefore, a manufacturing cost can be reduced.

The projection optical system 3A according to the embodiment satisfies the following conditional expression in which Φ1 is the reciprocal of the composite focal length (the seven lenses L1 to L7) of all the lenses, which are disposed on the magnification side with respect to the aperture stop 31, at the wide-angle end, and Φw is the reciprocal of the focal length of the entire system at the wide-angle end.

$$0.1 < \Phi 1/\Phi w < 1.3 \quad (1)$$

Here, in the projection optical system at the wide-angle end, an angle of rays incident on the lens disposed on the magnification side with respect to the aperture stop 31 is large, and thus various aberrations are likely to occur, as compared with the projection optical system at the telephoto end. Therefore, the projection optical system 3A according to the embodiment satisfies the conditional expression (1), and thus can favorably correct various aberrations while making a lens length of all the lenses disposed on the magnification side with respect to the aperture stop 31 compact. When a value of the conditional expression (1) is below a lower limit, the lens length can be made compact, but since the lens length is compact, not all the number of lenses required for correcting various aberrations can be disposed in the projection optical system, making it difficult to favorably correct the various aberrations. When the value of the conditional expression (1) exceeds an upper limit, all the number of lenses required for correcting the various aberrations can be disposed in the projection optical system, but the lens length is increased.

The projection optical system 3A according to the embodiment satisfies the following conditional expression, in which Fgs is the focal length of the fifth lens group G5 having negative power and disposed at the position closest to the aperture stop 31, and Fw is the focal length of the entire system at the wide-angle end.

$$-9.5 < Fgs/Fw < 0 \quad (2)$$

Here, in the projection optical system at the wide-angle end, an angle of rays incident on the fifth lens group G5 is large, and a field curve and an astigmatism are likely to occur, as compared with the projection optical system at the telephoto end. Therefore, the projection optical system 3A according to the embodiment satisfies the conditional expression (2), and thus can prevent occurrence of the field curve and the astigmatism. When a value of the conditional expression (2) is out of a range, the field curve and the astigmatism are likely to occur, and a resolution of a projection image projected by the projection optical system 3A deteriorates.

The projection optical system 3A according to the embodiment satisfies the following conditional expression, in which Fw is the focal length of the entire system at the wide-angle end, Ft is the focal length of the entire system at the telephoto end, LL is the total lens length, and IH is the maximum image height of the liquid crystal panel 18.

$$2.7 < (LL/IH)/(Ft/Fw) < 4.5 \quad (3)$$

The projection optical system 3A according to the embodiment satisfies the conditional expression (3), and thus can make the entire system compact while achieving a high zoom ratio. When a value of the conditional expression (3) is below a lower limit, the entire system can be made compact while achieving a high zoom ratio, but since the entire system is compact, not all the number of lenses required for correcting various aberrations can be disposed in the projection optical system, making it difficult to favorably correct the various aberrations. When the value of the conditional expression (3) exceeds an upper limit, all the number of lenses required for correcting the various aberrations can be disposed in the projection optical system, but it is difficult to achieve a high zoom ratio and to make the entire system compact.

The projection optical system 3A according to the embodiment satisfies the following conditional expression in which Φw is the reciprocal of the focal length of the entire system at the wide-angle end, and Φg1 is the reciprocal of the focal length of the first lens group G1.

$$-1.0 < \Phi g1/\Phi w < -0.5 \quad (4)$$

Here, in the projection optical system at the wide-angle end, an angle of rays incident on the first lens group G1 is large, and thus various aberrations are likely to occur, as compared with the projection optical system at the telephoto end. Therefore, the projection optical system 3A according to the embodiment satisfies the conditional expression (4), and thus can ensure a back focus while favorably correcting various aberrations. When a value of the conditional expression (4) is below a lower limit, the back focus can be ensured, but since power of the first lens group G1 is too strong, it is difficult to correct the various aberrations. When the value of the conditional expression (4) exceeds an upper limit, power of the first lens group G1 is weak, and thus the various aberrations can be favorably corrected, but it is difficult to ensure the back focus.

The projection optical system 3A according to the embodiment satisfies the following conditional expression in which Φw is the reciprocal of the focal length of the entire system at the wide-angle end, and Φg2 is the reciprocal of the focal length of the second lens group G2.

$$-1.0 < \Phi g2/\Phi w < 0.6 \quad (5)$$

Here, in the projection optical system at the wide-angle end, an angle of rays incident on the second lens group G2 is large, and thus various aberrations are likely to occur, as compared with the projection optical system at the telephoto end. Therefore, the projection optical system 3A according to embodiment satisfies the conditional expression (5), and thus can favorably correct various aberrations while reducing a size thereof. When a value of the conditional expression (5) is below a lower limit, a size can be reduced, but since negative power of the second lens group G2 is too strong, it is difficult to correct the various aberrations. When the value of the conditional expression (5) exceeds an upper limit, positive power of the second lens group G2 is weak, and thus the various aberrations can be favorably corrected, but the projection optical system is increased in size.

The third lens group G3 includes the lens L5 (positive lens) having positive power and the lens L6 (negative lens) having negative power. The projection optical system 3A according to the embodiment satisfies the following conditional expression in which Φg2 is the reciprocal of the focal length of the second lens group G2, and Φg3 is the reciprocal of the focal length of the third lens group G3.

$$-1.0 < \Phi g2/\Phi g3 < 1.7 \quad (6)$$

According to the embodiment, by adjusting lens power of the positive lens and the negative lens, the projection optical system 3A according to the embodiment can be made to fall within a range of the conditional expression (6). Accordingly, the projection optical system 3A satisfies the conditional expression (6), and thus can favorably correct a chromatic aberration and various aberrations. When a value of the conditional expression (6) is below a lower limit, a difference in power between the second lens group G2 and the third lens group G3 is large, and thus the chromatic aberration can be favorably corrected, but it is difficult to correct the various aberrations. When the value of the conditional expression (6) exceeds an upper limit, the difference in power between the second lens group G2 and the third lens group G3 is small, and thus the various aberrations can be favorably corrected, but it is difficult to correct the chromatic aberration.

The projection optical system 3A according to the embodiment includes the cemented lens L21 which includes the lens L5 (first lens) having positive power and the lens L6 (second lens) having negative power and which is disposed on the magnification side with respect to the aperture stop 31. The projection optical system 3A according to the embodiment satisfies the following conditional expression, in which Nd1 is a refractive index of the lens L5, Nd2 is a refractive index of the lens L6, Vd1 is an Abbe number of a d-line of the lens L5, and Vd2 is an Abbe number of a d-line of the lens L6.

$$7 < |(Nd1 \times Vd1) - (Nd2 \times Vd2)| < 28 \quad (7)$$

The projection optical system 3A according to the embodiment satisfies the conditional expression (7), and thus can favorably correct a chromatic aberration. When a value of the conditional expression (7) is out of a range, it is difficult to correct the chromatic aberration.

The projection optical system 3A according to the embodiment satisfies the following conditional expression, in which Nd2 is the refractive index of the lens L6 (second lens).

$$Nd2 < 1.85 \quad (8)$$

The projection optical system 3A according to the embodiment satisfies the conditional expression (8), and thus can favorably correct a chromatic aberration and reduce a cost of a lens material. That is, when a value of the conditional expression (8) exceeds an upper limit, it is difficult to favorably correct the chromatic aberration, and the cost of the lens material increases.

Figure 3:
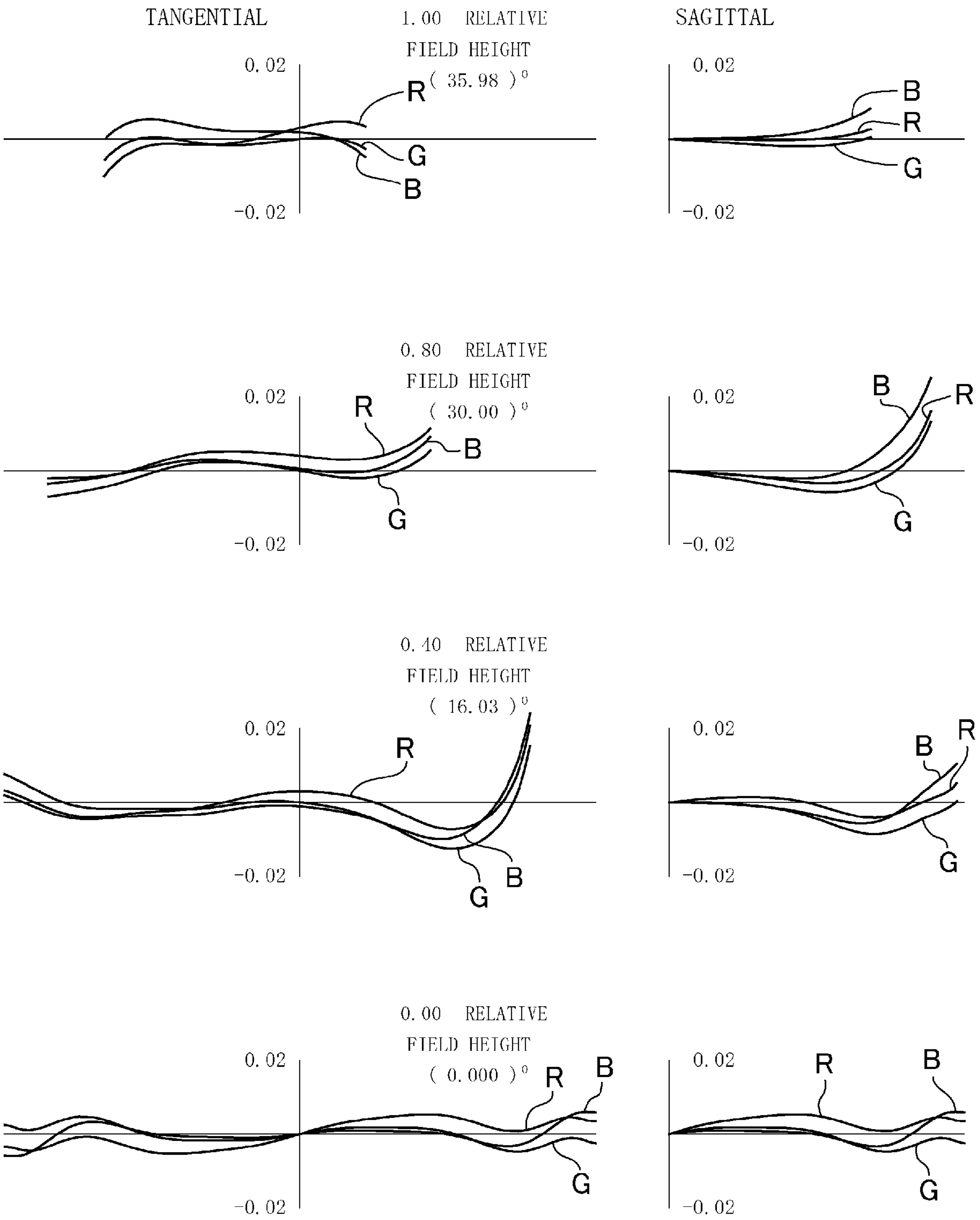
FIG. 3 is a diagram showing a coma aberration at a wide-angle end of the projection optical system according to the first embodiment.
Figure 4:
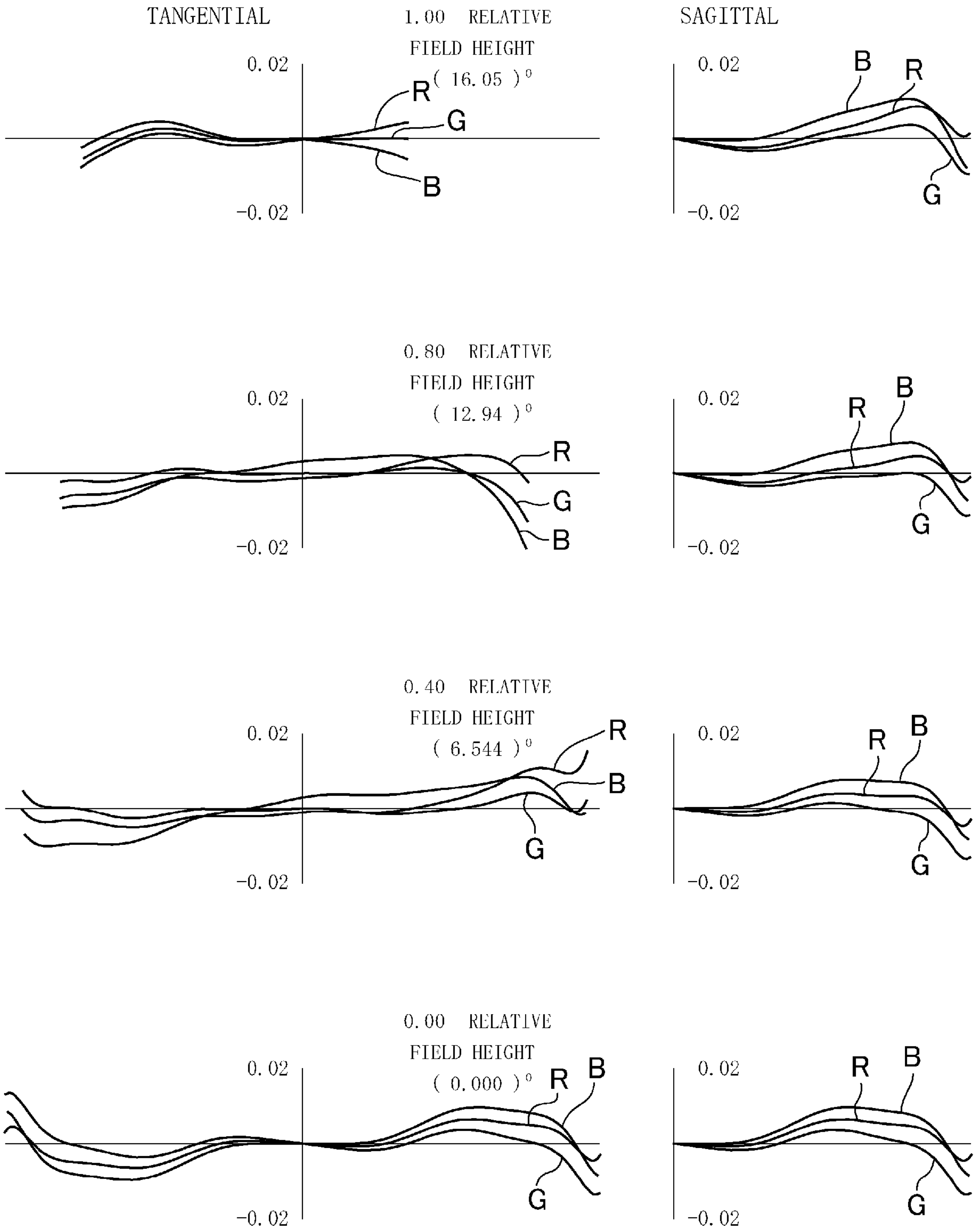
FIG. 4 is a diagram showing a coma aberration at a telephoto end of the projection optical system according to the first embodiment.
Figure 5:
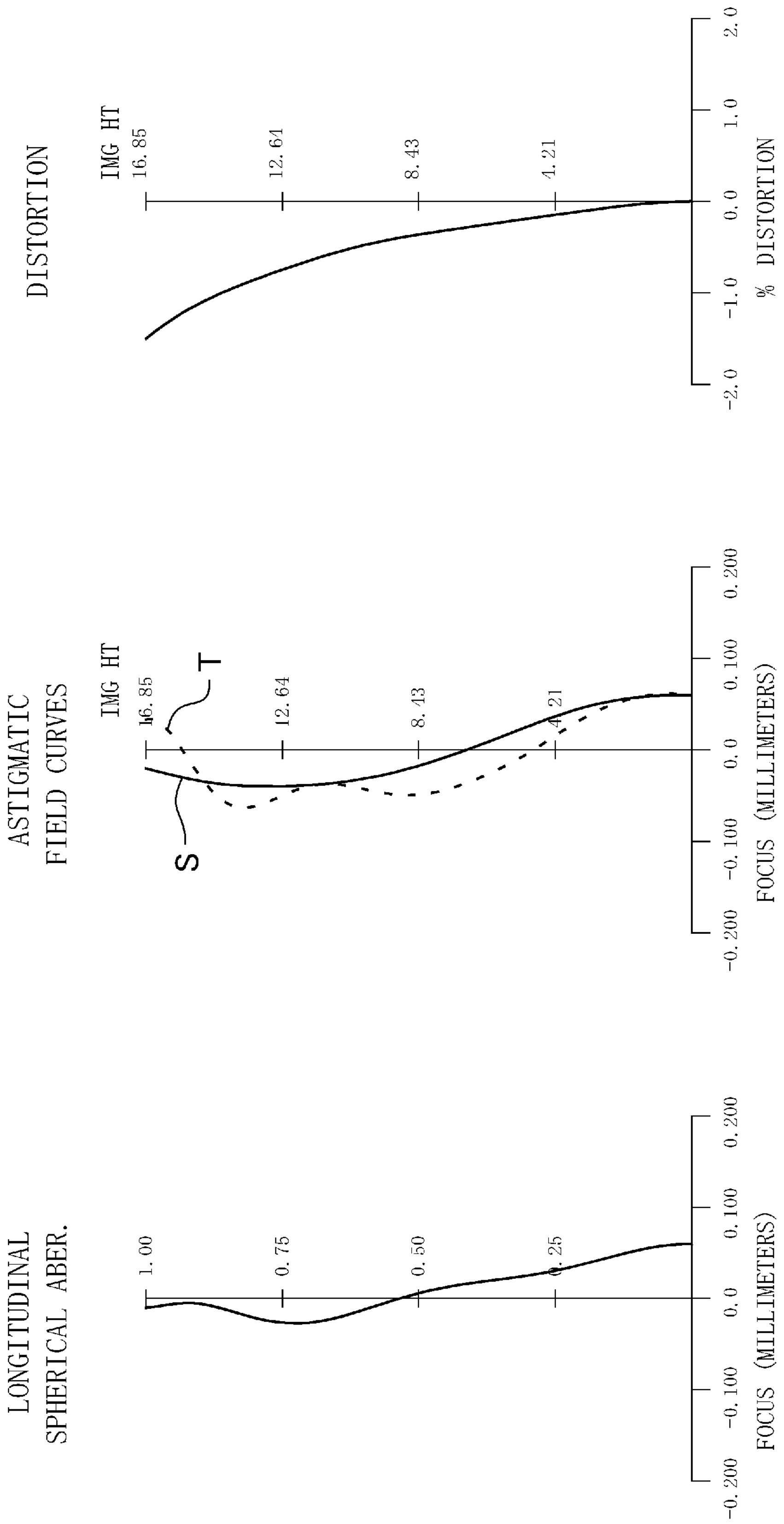
FIG. 5 is a diagram showing a spherical aberration, an astigmatism, and a distortion at the wide-angle end of the projection optical system according to the first embodiment.
Figure 6:
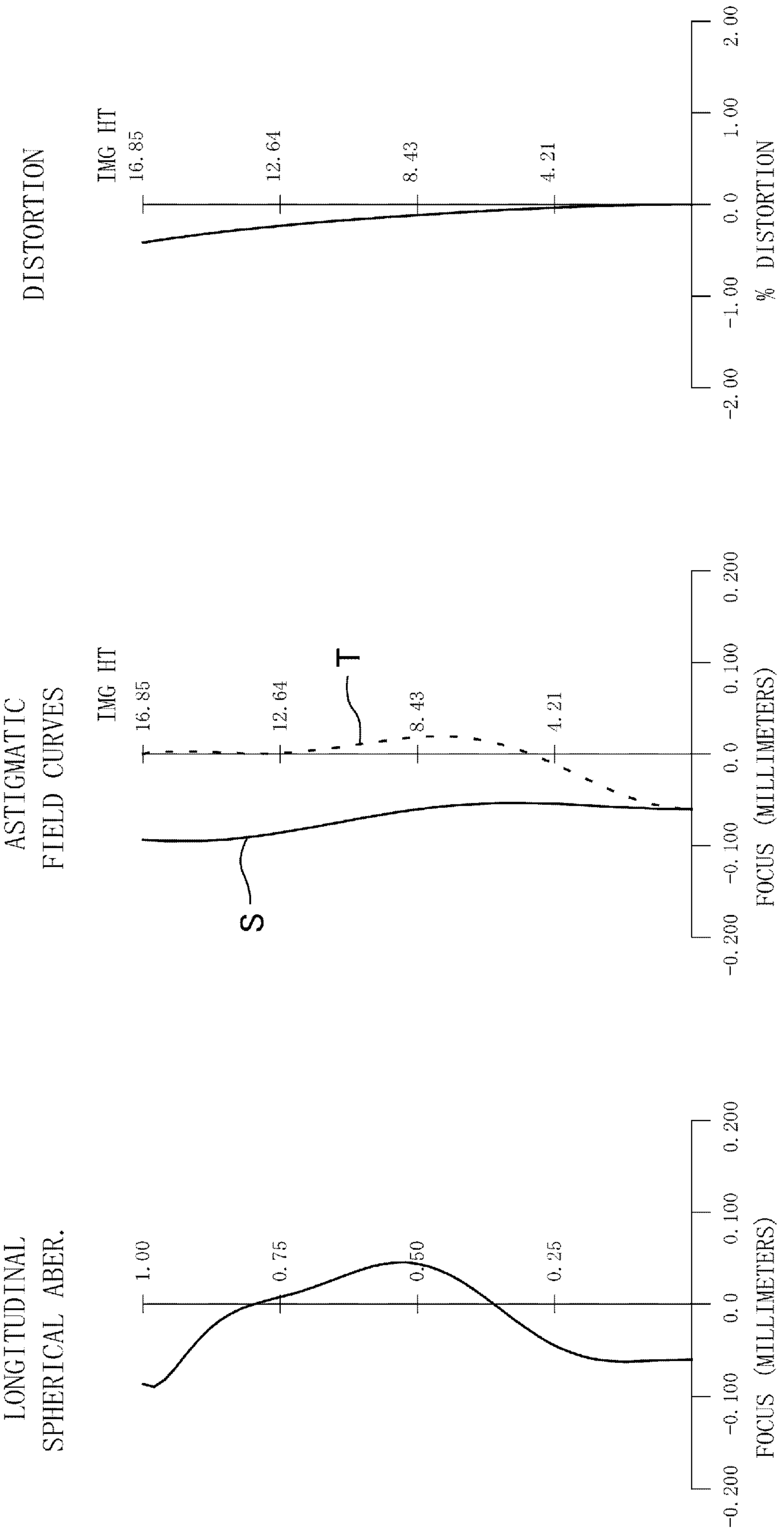
FIG. 6 is a diagram showing a spherical aberration, an astigmatism, and a distortion at the telephoto end of the projection optical system according to the first embodiment.

FIG. 3 is a diagram showing a coma aberration at a wide-angle end of the projection optical system 3A. FIG. 4 is a diagram showing a coma aberration at a telephoto end of the projection optical system 3A. FIG. 5 is a diagram showing a spherical aberration, an astigmatism, and a distortion at the wide-angle end of the projection optical system 3A. FIG. 6 is a diagram showing a spherical aberration, an astigmatism, and a distortion at the telephoto end of the projection optical system 3A. In the aberration diagrams, "G" represents an aberration at a wavelength of 550.0 nm, "R" represents an aberration at a wavelength of 620.0 nm, "B" represents an aberration at a wavelength of 470.0 nm, "S" represents a sagittal image plane at a wavelength of 550.0 nm, and "T" represents a tangential image plane at a wavelength of 550.0 nm.

A maximum value of the coma aberration in the projection optical system 3A is as follows.

| | Wide-angle end | Telephoto end |
|---|---|---|
| Maximum value of coma aberration (mm) | 0.0181 | 0.0184 |

As shown in FIGS. 3 to 6, various aberrations are prevented in the projection optical system 3A according to the embodiment. The coma aberration occurring in the projection optical system 3A according to the embodiment is favorably prevented.

Second Embodiment

Figure 7:
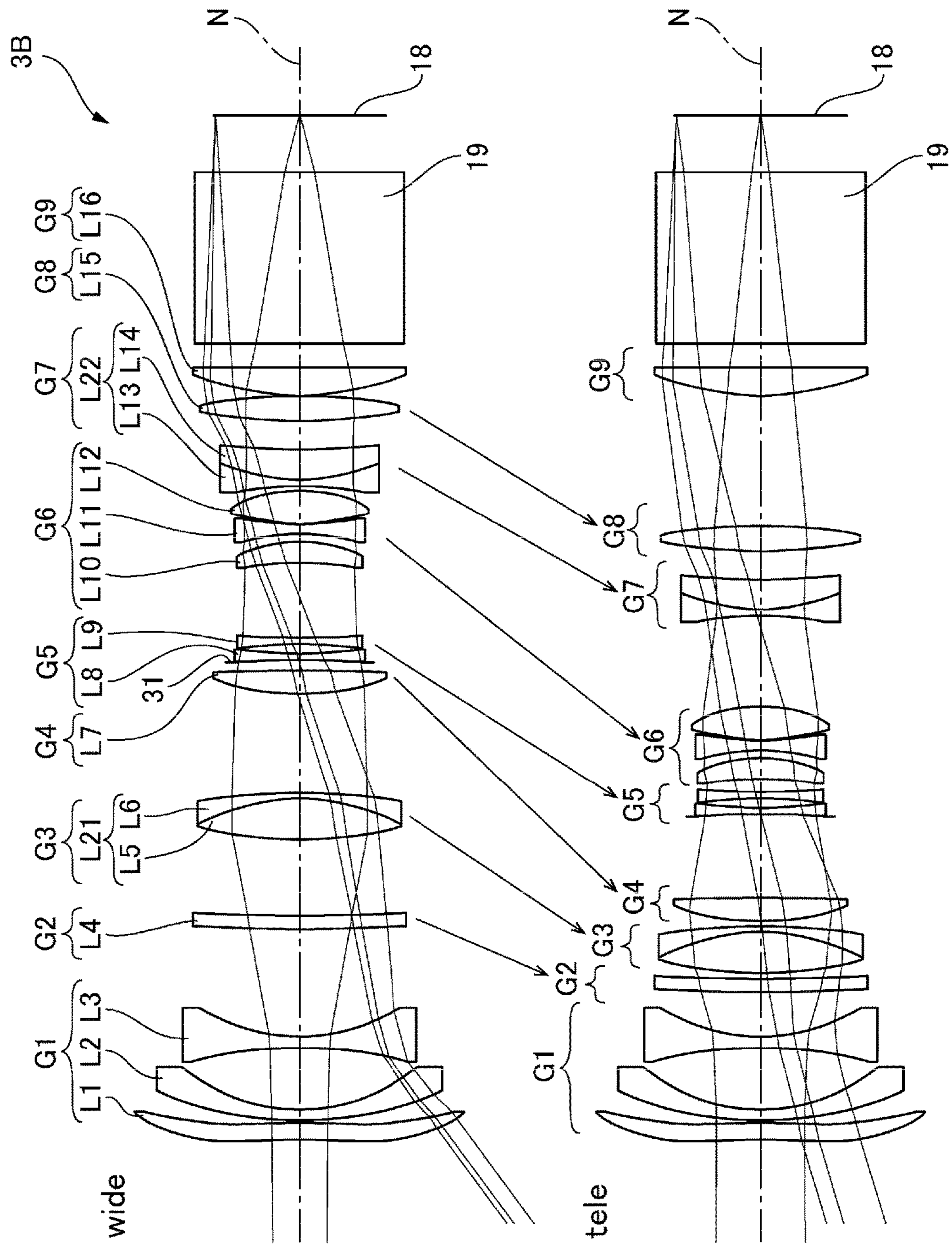
FIG. 7 is a ray diagram of a projection optical system according to a second embodiment.

FIG. 7 is a ray diagram of a projection optical system 3B according to a second embodiment. As shown in FIG. 7, the projection optical system 3B includes, in an order from a magnification side to a reduction side, the first lens group G1 having negative power, the second lens group G2 having negative power, the third lens group G3 having positive power, the fourth lens group G4 having positive power, the fifth lens group G5 having negative power, the sixth lens group G6 having positive power, the seventh lens group G7 having negative power, the eighth lens group G8 having positive power, and the ninth lens group G9 having positive power. The projection optical system 3B includes the aperture stop 31 disposed between the fourth lens group G4 and the fifth lens group G5.

The first lens group G1 includes three lenses L1 to L3. The lenses L1 to L3 are disposed in this order from the magnification side toward the reduction side. The lens L1 is made of resin. The lens L1 has negative power. The lens L2 has negative power. The lens L2 is a meniscus lens. The lens L2 has a convex shape on a magnification side surface thereof and a concave shape on a reduction side surface thereof. The lens L3 has negative power. The lens L3 has concave shapes on magnification side and reduction side surfaces thereof.

The second lens group G2 includes one lens L4. The lens L4 has negative power. The lens L4 is a meniscus lens. The lens L4 has a convex shape on a magnification side surface thereof and a concave shape on a reduction side surface thereof. The third lens group G3 includes two lenses L5 to L6. The lenses L5 to L6 are disposed in this order from the magnification side to the reduction side. The lens L5 (positive lens, first lens) has positive power. The lens L5 has convex shapes on magnification side and reduction side surfaces thereof. The lens L6 (negative lens, second lens) has negative power. The lens L6 is a meniscus lens. The lens L6 has a concave shape on a magnification side surface thereof and a convex shape on a reduction side surface thereof. The lens L5 and the lens L6 are cemented to form a cemented lens L21. The fourth lens group G4 includes one lens L7. The lens L7 has positive power. The lens L7 has convex shapes on magnification side and reduction side surfaces thereof.

The fifth lens group G5 includes two lenses L8 to L9. The lenses L8 to L9 are disposed in this order from the magnification side to the reduction side. The lens L8 has negative power. The lens L8 has concave shapes on magnification side and reduction side surfaces thereof. The lens L9 has negative power. The lens L9 has concave shapes on magnification side and reduction side surfaces thereof.

The sixth lens group G6 includes three lenses L10 to L12. The lenses L10 to L12 are disposed in this order from the magnification side toward the reduction side. The lens L10 has positive power. The lens L10 is a meniscus lens. The lens L10 has a concave shape on a magnification side surface thereof and a convex shape on a reduction side surface thereof. The lens L11 has negative power. The lens L11 has concave shapes on magnification side and reduction side surfaces thereof. The lens L12 has positive power. The lens L12 has convex shapes on magnification side and reduction side surfaces thereof.

The seventh lens group G7 includes two lenses L13 to L14. The lenses L13 to L14 are disposed in this order from the magnification side to the reduction side. The lens L13 has negative power. The lens L13 has concave shapes on magnification side and reduction side surfaces thereof. The lens L14 has positive power. The lens L14 has convex shapes on magnification side and reduction side surfaces thereof. The lens L13 and the lens L14 are cemented to form the cemented lens L22.

The eighth lens group G8 includes one lens L15. The lens L15 has positive power. The lens L15 has convex shapes on magnification side and reduction side surfaces thereof. The ninth lens group G9 includes one lens L16. The lens L16 has positive power. The lens L16 is a meniscus lens. The lens L16 has a convex shape on a magnification side surface thereof and a concave shape on a reduction side surface thereof.

Here, the lens L1 (first aspherical lens) and the lens L10 (second aspherical lens) are aspherical lenses having aspherical shapes on magnification side and reduction side surfaces thereof. The lenses L2 to L9 and L11 to L16 are spherical lenses having spherical shapes on magnification side and reduction side surfaces thereof.

In the projection optical system 3B, the reduction side with respect to the lens L16 of the ninth lens group G9 is telecentric.

The projection optical system 3B is a zoom lens and changes an angle of view between a wide-angle end and a telephoto end. In the projection optical system 3B, during zooming, the first lens group G1 and the ninth lens group G9 are fixed, and the second lens group G2, the third lens group G3, the fourth lens group G4, the fifth lens group G5, the sixth lens group G6, the seventh lens group G7, and the eighth lens group G8 move along the optical axis N. The second lens group G2, the third lens group G3, the fourth lens group G4, the fifth lens group G5, the sixth lens group G6, the seventh lens group G7, and the eighth lens group G8 each move from the reduction side to the magnification side along the optical axis N when zooming from the wide-angle end to the telephoto end. In the embodiment, a zoom ratio is about 2.50.

When an F number of the projection optical system 3B is FNo, a focal length of the entire system at the wide-angle end is Fw, a focal length of the entire system at the telephoto end is Ft, a reciprocal of the focal length of the entire system at the wide-angle end is Φw, a zoom ratio is Z, a back focus is BF, a total lens length (a distance from an object side surface of the lens L1 to a reduction side surface of the lens L16) is LL, a maximum image height of the liquid crystal panel 18 is IH, a reciprocal of a composite focal length of all the lenses (the seven lenses L1 to L7), which are disposed on the magnification side with respect to the aperture stop 31, at the wide-angle end is Φ1, a focal length of the fifth lens group G5 having negative power and disposed at a position closest to the aperture stop 31 is Fgs, a reciprocal of a focal length of the first lens group G1 is Φg1, a reciprocal of a focal length of the second lens group G2 is Φg2, and a reciprocal of a focal length of the third lens group G3 is Φg3, data on the projection optical system 3B is as follows.

| FNo (wide-angle end to telephoto end) | 2.11-3.23 |
|---|---|
| Fw | 23.520 (mm) |
| Ft | 58.800 (mm) |
| Φw | 0.0425 (1/mm) |
| Z | 2.500 |
| BF | 52.470 (mm) |
| LL | 160.000 (mm) |
| IH | 16.850 (mm) |
| Φ1 | 0.0435 (1/mm) |
| Fgs | −50.10 (mm) |
| Φg1 | −0.031 (1/mm) |
| Φg2 | −0.0002 (1/mm) |
| Φg3 | 0.015 (1/mm) |

Lens data on the projection optical system 3B is as follows. Surface numbers are assigned in an order from the magnification side to the reduction side. Reference numerals are those of the screen, the lens, the dichroic prism, and the liquid crystal panel. A surface whose surface number is attached with * is an aspherical surface. R is a radius of curvature. Dis an axial surface interval. Nd is a refractive index of a d-line. Vd is an Abbe number of the d-line. A unit of R and D is mm.

| Reference numeral | Surface number | R | D | Nd | Vd |
|---|---|---|---|---|---|
| S | 0 | 1.00E+18 | 2540.0000 | | |
| L01 | 1* | −125.3632 | 3.5814 | 1.53504 | 55.711 |
| | 2* | −128.1292 | 0.4000 | | |
| L02 | 3 | 69.1057 | 2.1945 | 1.48749 | 70.236 |
| | 4 | 36.2610 | 12.7845 | | |
| L03 | 5 | −79.5803 | 2.5000 | 1.57627 | 62.852 |
| | 6 | 37.4753 | Variable interval 1 | | |
| L04 | 7 | 261.5518 | 3.0000 | 1.71973 | 46.884 |
| | 8 | 239.7758 | Variable interval 2 | | |
| L05 | 9 | 80.8424 | 8.3678 | 1.74334 | 34.592 |
| L06 | 10 | −41.1786 | 1.2202 | 1.75511 | 27.583 |
| | 11 | −112.9313 | Variable interval 3 | | |
| L07 | 12 | 44.3421 | 5.0577 | 1.66551 | 46.575 |
| | 13 | −380.4533 | Variable interval 4 | | |
| 31 | 14 | 1.00E+18 | 0.5412 | | |
| L08 | 15 | −223.6920 | 1.2174 | 1.52498 | 53.630 |
| | 16 | 82.8943 | 2.1415 | | |
| L09 | 17 | −81.1991 | 1.2000 | 1.51402 | 57.422 |
| | 18 | 112.1553 | Variable interval 5 | | |
| L10 | 19* | −166.8818 | 4.5714 | 1.58313 | 59.386 |
| | 20* | −32.4786 | 1.5000 | | |
| L11 | 21 | −44.6189 | 2.1262 | 1.70469 | 29.958 |
| | 22 | 55.8722 | 0.1505 | | |
| L12 | 23 | 45.3103 | 7.0000 | 1.49700 | 81.546 |
| | 24 | −26.8250 | Variable interval 6 | | |
| L13 | 25 | −65.8559 | 1.3064 | 1.75520 | 27.580 |
| L14 | 26 | 37.2069 | 6.2855 | 1.49700 | 81.546 |
| | 27 | 150.8072 | Variable interval 7 | | |
| L15 | 28 | 105.2063 | 5.0689 | 1.92286 | 20.880 |
| | 29 | −115.3052 | Variable interval 8 | | |
| L16 | 30 | 52.8051 | 5.7096 | 1.49700 | 81.546 |
| | 31 | 4001.3891 | 5.1000 | | |
| 19 | 32 | 1.00E+18 | 35.5400 | 1.51680 | 64.198 |
| | 33 | 1.00E+18 | 0.0000 | | |
| 18 | 34 | 1.00E+18 | 11.8300 | | |

The variable interval 1, the variable interval 2, the variable interval 3, the variable interval 4, the variable interval 5, the variable interval 6, the variable interval 7, and the variable interval 8 during zooming are shown below.

| | Wide-angle end | Telephoto end |
|---|---|---|
| Variable interval 1 | 21.9300 | 8.0000 |
| Variable interval 2 | 14.8600 | 0.1000 |
| Variable interval 3 | 20.5100 | 0.4000 |
| Variable interval 4 | 1.5000 | 17.1100 |
| Variable interval 5 | 13.2500 | 0.6600 |
| Variable interval 6 | 0.8000 | 19.5200 |
| Variable interval 7 | 5.8700 | 5.4500 |
| Variable interval 8 | 0.2400 | 27.7200 |

Each aspherical coefficient is as follows.

| Surface number | 1 | 2 |
|---|---|---|
| R | −125.3632 | −128.1292 |
| Conic constant (K) | 11.3558 | 2.0434 |
| 4th-order coefficient | 1.738118E−05 | 1.547571E−05 |
| 6th-order coefficient | −1.502273E−08 | −1.372548E−08 |
| 8th-order coefficient | 1.050377E−11 | 2.106483E−12 |

-continued

| | | |
|---|---|---|
| 10th-order coefficient | −4.580731E−15 | 6.301545E−15 |
| 12th-order coefficient | 1.889186E−18 | −4.053807E−18 |
| 14th-order coefficient | −1.995975E−22 | 4.787097E−22 |

| Surface number | 19 | 20 |
|---|---|---|
| R | −166.8818 | −32.4786 |
| Conic constant (K) | −99.0000 | 0.5362 |
| 4th-order coefficient | −2.768151E−05 | −9.679256E−06 |
| 6th-order coefficient | −7.211029E−08 | −5.117804E−08 |
| 8th-order coefficient | −5.759140E−11 | −7.305512E−11 |
| 10th-order coefficient | −1.384171E−12 | −4.970692E−13 |
| 12th-order coefficient | 1.505845E−15 | |

Here, the projection optical system 3B according to the embodiment satisfies conditional expressions (1) to (8) similarly to the projection optical system 3A according to the first embodiment.

In the embodiment, variables are as below.

| | |
|---|---|
| Φ1 | 0.0435 (1/mm) |
| Φw | 0.0425 (1/mm) |

Therefore, Φ1/Φw=1.024, which satisfies the conditional expression (1).

In the embodiment, variables are as below.

| | |
|---|---|
| Fgs | −50.10 (mm) |
| Fw | 23.520 (mm) |

Therefore, Fgs/Fw=−2.130, which satisfies the conditional expression (2).

In the embodiment, variables are as below.

| | |
|---|---|
| Fw | 23.520 (mm) |
| Ft | 58.800 (mm) |
| LL | 160.000 (mm) |
| IH | 16.850 (mm) |

Therefore, (LL/IH)/(Ft/Fw)=3.798, which satisfies the conditional expression (3).

In the embodiment, variables are as below.

| | |
|---|---|
| Φw | 0.0425 (1/mm) |
| Φg1 | −0.031 (1/mm) |

Therefore, Φg1/Φw=−0.74, which satisfies the conditional expression (4).

In the embodiment, variables are as below.

| | |
|---|---|
| Φw | 0.0425 (1/mm) |
| Φg2 | −0.0002 (1/mm) |

Therefore, Φg2/Φw=−0.006, which satisfies the conditional expression (5).

In the embodiment, variables are as below.

| | |
|---|---|
| Φg2 | −0.0002 (1/mm) |
| Φg3 | 0.015 (1/mm) |

Therefore, Φg2/Φg3=−0.015, which satisfies the conditional expression (6).

In the embodiment, variables are as below.

| | |
|---|---|
| Nd1 | 1.743 |
| Nd2 | 1.755 |
| Vd1 | 34.592 |
| Vd2 | 27.583 |

Therefore, |(Nd1×Vd1)−(Nd2×Vd2)|=11.895, which satisfies the conditional expression (7).

In the embodiment, Nd2=1.755, which satisfies the conditional expression (8).

Effects

According to the embodiment, since the projection optical system 3B has a configuration similar to that of the projection optical system 3A according to the first embodiment, effects similar to those of the projection optical system 3A according to the first embodiment can be obtained.

Since the projection optical system 3B according to the embodiment satisfies the conditional expressions (1) to (8), effects similar to those of the projection optical system 3A according to the first embodiment can be obtained.

Figure 8:
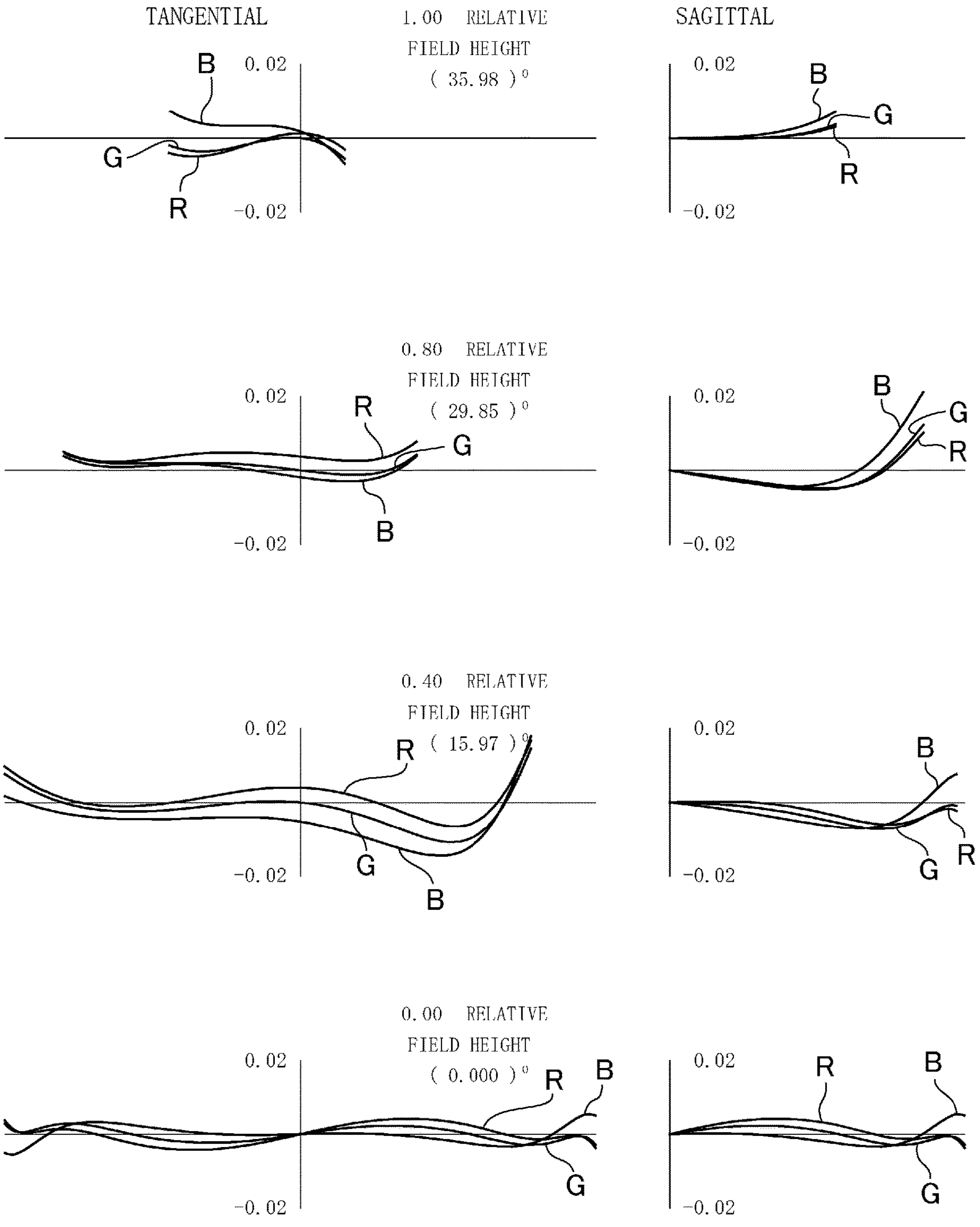
FIG. 8 is a diagram showing a coma aberration at a wide-angle end of the projection optical system according to the second embodiment.
Figure 9:
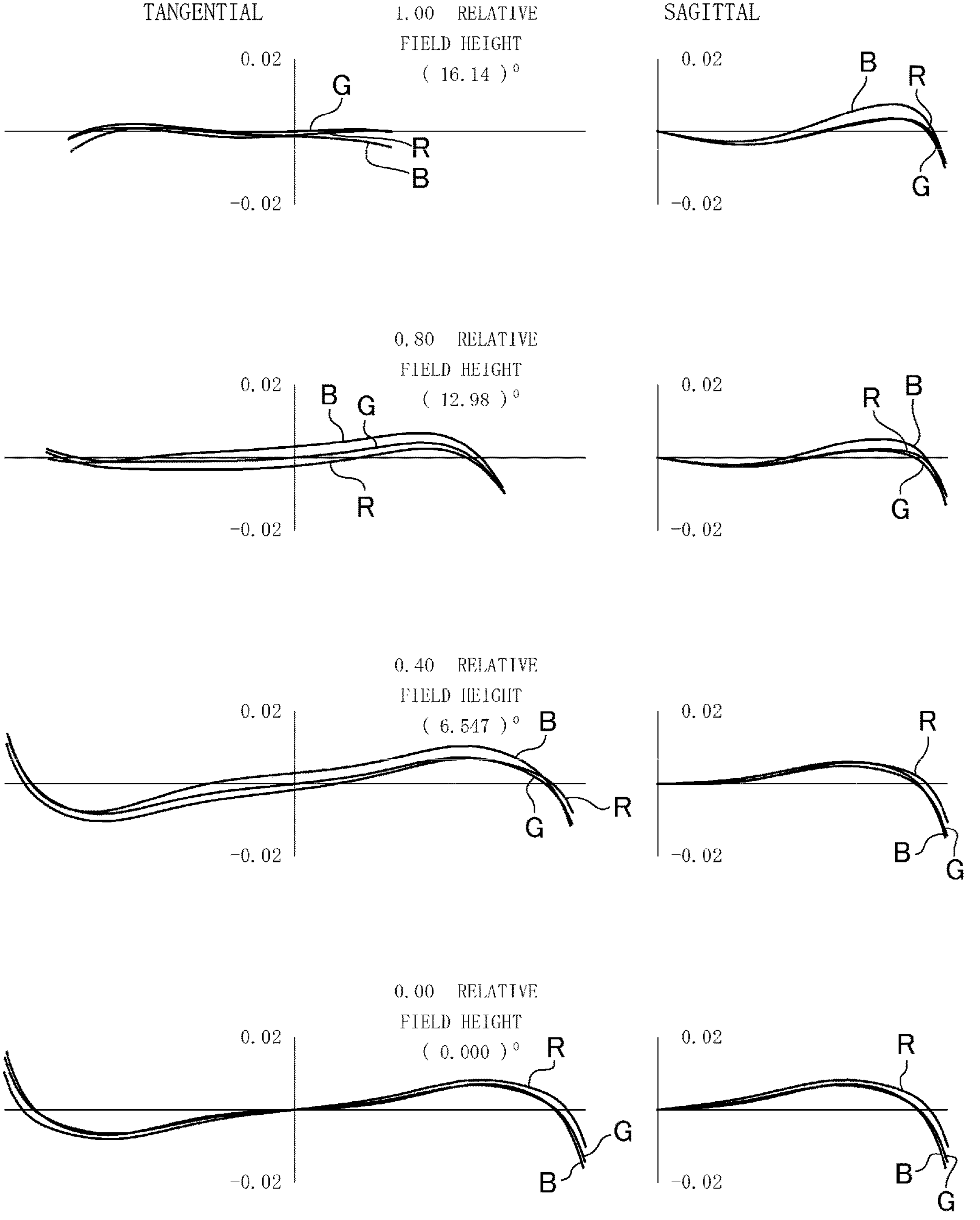
FIG. 9 is a diagram showing a coma aberration at a telephoto end of the projection optical system according to the second embodiment.
Figure 10:
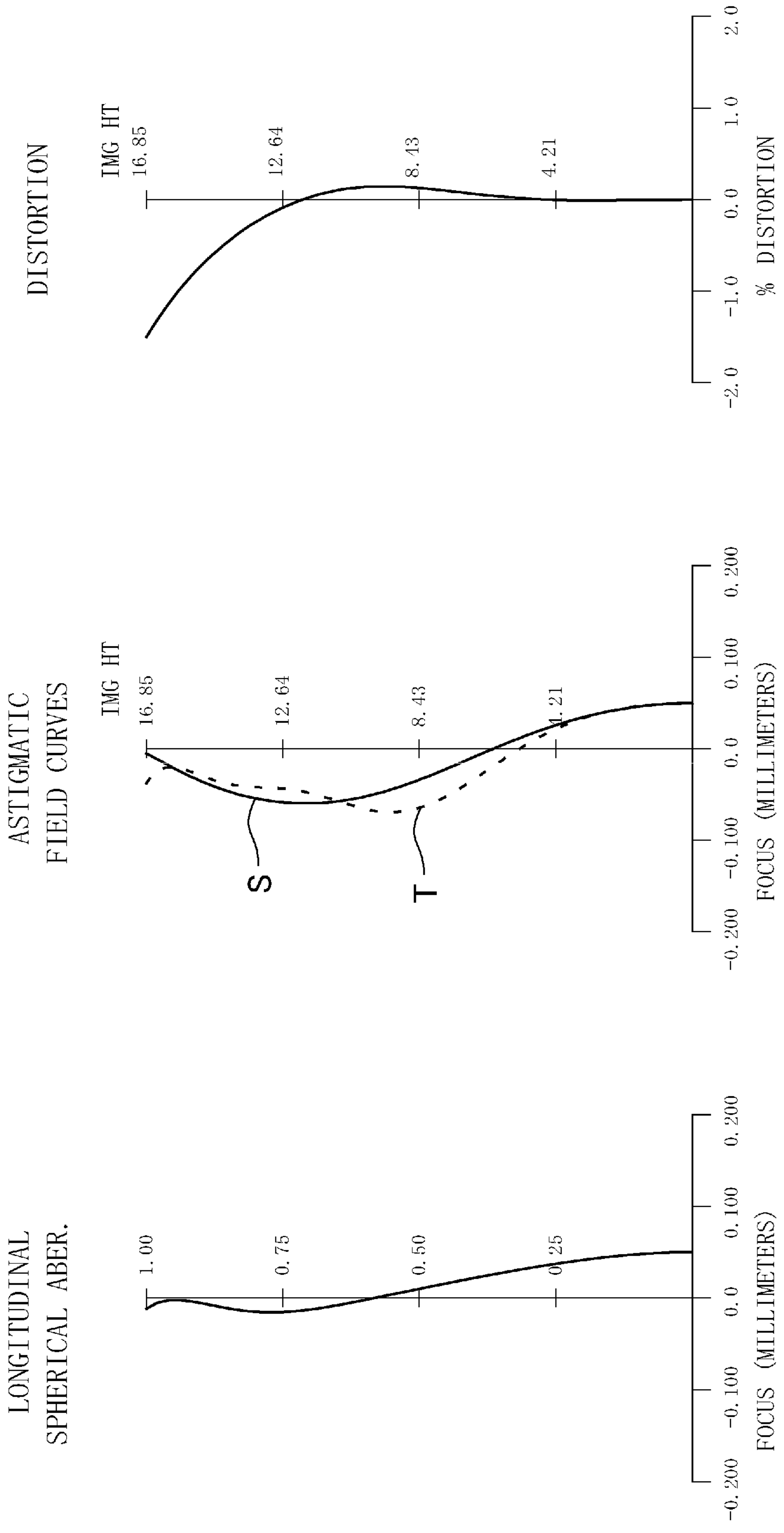
FIG. 10 is a diagram showing a spherical aberration, an astigmatism, and a distortion at the wide-angle end of the projection optical system according to the second embodiment.
Figure 11:
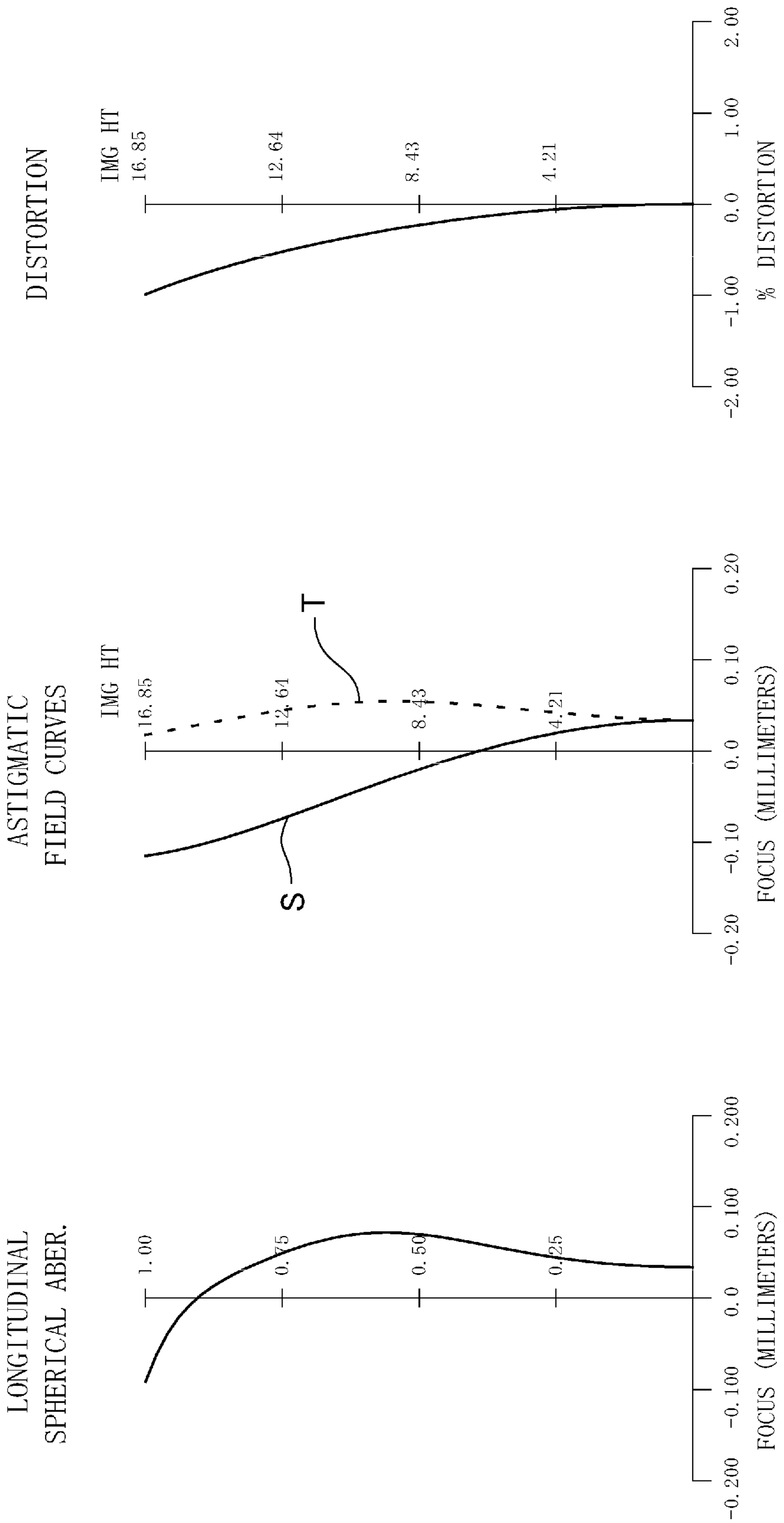
FIG. 11 is a diagram showing a spherical aberration, an astigmatism, and a distortion at the telephoto end of the projection optical system according to the second embodiment.

FIG. 8 is a diagram showing a coma aberration at a wide-angle end of the projection optical system 3B. FIG. 9 is a diagram showing a coma aberration at a telephoto end of the projection optical system 3B. FIG. 10 is a diagram showing a spherical aberration, an astigmatism, and a distortion at the wide-angle end of the projection optical system 3B. FIG. 11 is a diagram showing a spherical aberration, an astigmatism, and a distortion at the telephoto end of the projection optical system 3B.

A maximum value of the coma aberration in the projection optical system 3B is as follows.

| | Wide-angle end | Telephoto end |
|---|---|---|
| Maximum value of coma aberration (mm) | 0.0146 | 0.0160 |

As shown in FIGS. 8 to 11, various aberrations are prevented in the projection optical system 3B according to the embodiment. The coma aberration occurring in the projection optical system 3B according to the embodiment is favorably prevented.

Third Embodiment

Figure 12:
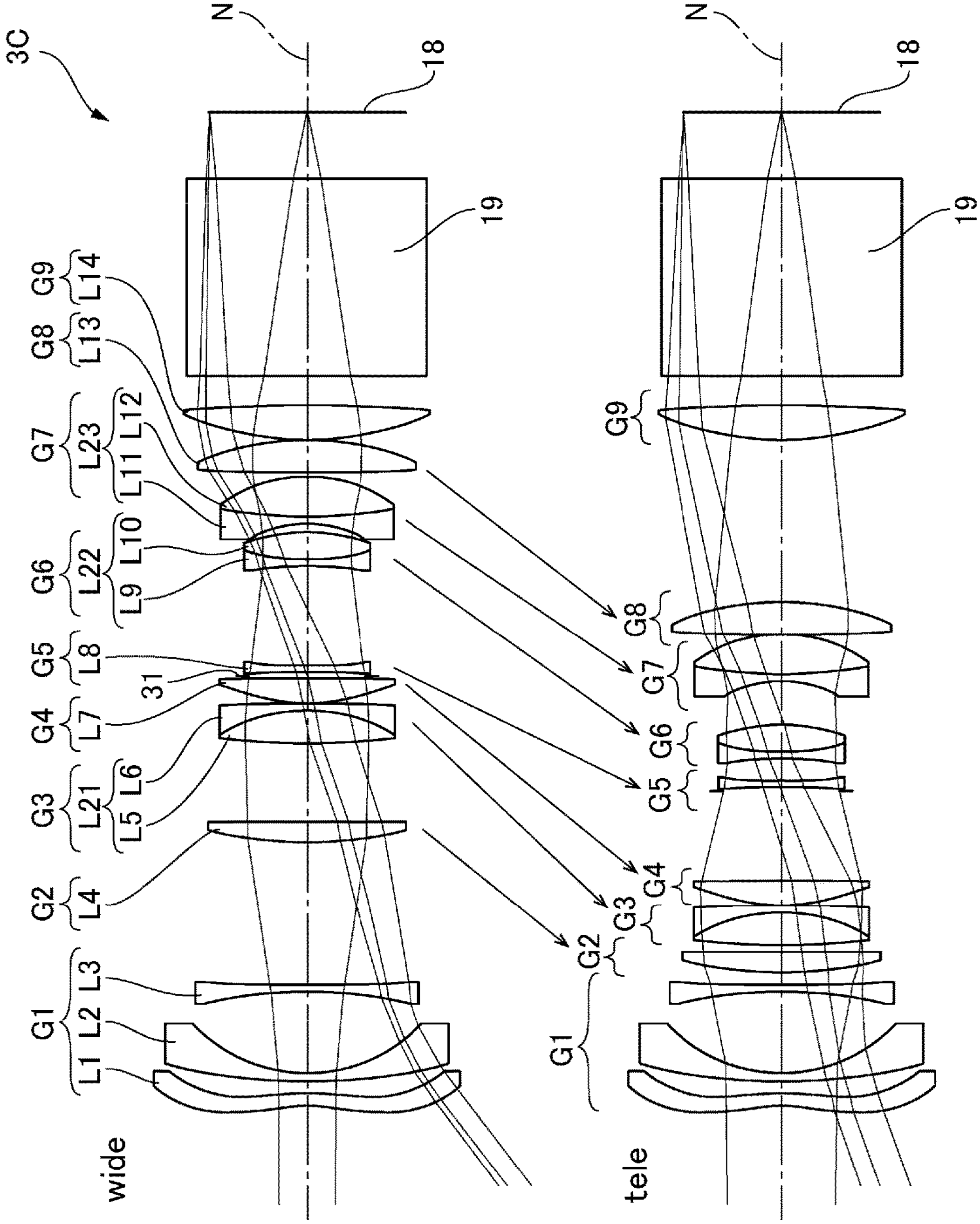
FIG. 12 is a ray diagram of a projection optical system according to a third embodiment.

FIG. 12 is a ray diagram of a projection optical system 3C according to a third embodiment. As shown in FIG. 12, the projection optical system 3C includes, in an order from a magnification side to a reduction side, the first lens group G1 having negative power, the second lens group G2 having positive power, the third lens group G3 having positive power, the fourth lens group G4 having positive power, the fifth lens group G5 having negative power, the sixth lens group G6 having negative power, the seventh lens group G7 having negative power, the eighth lens group G8 having positive power, and the ninth lens group G9 having positive power. The projection optical system 3C includes the aperture stop 31 disposed between the fourth lens group G4 and the fifth lens group G5.

The first lens group G1 includes three lenses L1 to L3. The lenses L1 to L3 are disposed in this order from the magnification side toward the reduction side. The lens L1 is made of resin. The lens L1 has negative power. The lens L2 has negative power. The lens L2 is a meniscus lens. The lens L2 has a convex shape on a magnification side surface thereof and a concave shape on a reduction side surface thereof. The lens L3 has negative power. The lens L3 has concave shapes on magnification side and reduction side surfaces thereof.

The second lens group G2 includes one lens L4. The lens L4 has positive power. The lens L4 is a meniscus lens. The lens L4 has a convex shape on a magnification side surface thereof and a concave shape on a reduction side surface thereof. The third lens group G3 includes two lenses L5 to L6. The lenses L5 to L6 are disposed in this order from the magnification side to the reduction side. The lens L5 (positive lens, first lens) has positive power. The lens L5 has convex shapes on magnification side and reduction side surfaces thereof. The lens L6 (negative lens, second lens) has negative power. The lens L6 is a meniscus lens. The lens L6 has a concave shape on a magnification side surface thereof and a convex shape on a reduction side surface thereof. The lens L5 and the lens L6 are cemented to form a cemented lens L21. The fourth lens group G4 includes one lens L7. The lens L7 has positive power. The lens L7 has convex shapes on magnification side and reduction side surfaces thereof.

The fifth lens group G5 includes one lens L8. The lens L8 has negative power. The lens L8 has concave shapes on magnification side and reduction side surfaces thereof. The sixth lens group G6 includes two lenses L9 to L10. The lenses L9 to L10 are disposed in this order from the magnification side toward the reduction side. The lens L9 has negative power. The lens L9 has concave shapes on magnification side and reduction side surfaces thereof. The lens L10 has positive power. The lens L10 has convex shapes on magnification side and reduction side surfaces thereof. The lens L9 and the lens L10 are cemented to form the cemented lens L22.

The seventh lens group G7 includes two lenses L11 to L12. The lenses L11 to L12 are disposed in this order from the magnification side to the reduction side. The lens L11 has negative power. The lens L11 has concave shapes on magnification side and reduction side surfaces thereof. The lens L12 has positive power. The lens L12 has convex shapes on magnification side and reduction side surfaces thereof. The lens L11 and the lens L12 are cemented to form a cemented lens L23.

The eighth lens group G8 includes one lens L13. The lens L13 has positive power. The lens L13 has convex shapes on magnification side and reduction side surfaces thereof. The ninth lens group G9 includes one lens L14. The lens L14 has positive power. The lens L14 has convex shapes on magnification side and reduction side surfaces thereof.

Here, the lens L1 (first aspherical lens) and the lens L8 (second aspherical lens) are aspherical lenses having aspherical shapes on magnification side and reduction side surfaces thereof. The lenses L2 to L7 and L9 to L14 are spherical lenses having spherical shapes on magnification side and reduction side surfaces thereof.

In the projection optical system 3C, the reduction side with respect to the lens L14 of the ninth lens group G9 is telecentric.

The projection optical system 3C is a zoom lens and changes an angle of view between a wide-angle end and a telephoto end. In the projection optical system 3C, during zooming, the first lens group G1 and the ninth lens group G9 are fixed, and the second lens group G2, the third lens group G3, the fourth lens group G4, the fifth lens group G5, the sixth lens group G6, the seventh lens group G7, and the eighth lens group G8 move along the optical axis N. The second lens group G2, the third lens group G3, the fourth lens group G4, the fifth lens group G5, the sixth lens group G6, the seventh lens group G7, and the eighth lens group G8 each move from the reduction side to the magnification side along the optical axis N when zooming from the wide-angle end to the telephoto end. In the embodiment, a zoom ratio is about 2.08.

When an F number of the projection optical system 3C is FNo, a focal length of the entire system at the wide-angle end is Fw, a focal length of the entire system at the telephoto end is Ft, a reciprocal of the focal length of the entire system at the wide-angle end is Φw, a zoom ratio is Z, a back focus is BF, a total lens length (a distance from an object side surface of the lens L1 to a reduction side surface of the lens L14) is LL, a maximum image height of the liquid crystal panel 18 is IH, a reciprocal of a composite focal length of all the lenses (the seven lenses L1 to L7), which are disposed on the magnification side with respect to the aperture stop 31, at the wide-angle end is Φ1, a focal length of the fifth lens group G5 having negative power and disposed at a position closest to the aperture stop 31 is Fgs, a reciprocal of a focal length of the first lens group G1 is Φg1, a reciprocal of a focal length of the second lens group G2 is Φg2, and a reciprocal of a focal length of the third lens group G3 is Φg3, data on the projection optical system 3C is as follows.

| FNo (wide-angle end to telephoto end) | 2.33-2.62 |
|---|---|
| Fw | 23.520 (mm) |
| Ft | 48.960 (mm) |
| Φw | 0.0425 (1/mm) |
| Z | 2.082 |
| BF | 52.470 (mm) |
| LL | 126.000 (mm) |
| IH | 16.850 (mm) |
| Φ1 | 0.0468 (1/mm) |
| Fgs | −199.48 (mm) |
| Φg1 | −0.029 (1/mm) |
| Φg2 | 0.011 (1/mm) |
| Φg3 | 0.007 (1/mm) |

Lens data on the projection optical system 3C is as follows. Surface numbers are assigned in an order from the magnification side to the reduction side. Reference numerals are those of the screen, the lens, the dichroic prism, and the liquid crystal panel. A surface whose surface number is attached with * is an aspherical surface. R is a radius of curvature. Dis an axial surface interval. Nd is a refractive index of a d-line. Vd is an Abbe number of the d-line. A unit of R and D is mm.

| Reference numeral | Surface number | R | D | Nd | Vd |
|---|---|---|---|---|---|
| S | 0 | 1.00E+18 | 2400.0000 | | |
| L01 | 1* | −27.7287 | 2.2519 | 1.53504 | 55.711 |
| | 2* | −36.0726 | 2.1190 | | |
| L02 | 3 | 97.6312 | 1.5000 | 1.48749 | 70.236 |
| | 4 | 26.6388 | 14.5957 | | |
| L03 | 5 | −74.8359 | 1.2000 | 1.53996 | 59.463 |
| | 6 | 508.1933 | Variable interval 1 | | |
| L04 | 7 | 68.0361 | 3.7008 | 1.75520 | 27.512 |
| | 8 | 16930.6000 | Variable interval 2 | | |
| L05 | 9 | 154.7175 | 5.8892 | 1.80000 | 29.845 |
| L06 | 10 | −27.9861 | 1.2000 | 1.80518 | 25.425 |
| | 11 | −331.6880 | Variable interval 3 | | |
| L07 | 12 | 36.1533 | 4.4205 | 1.60311 | 60.641 |
| | 13 | −1127.4600 | Variable interval 4 | | |
| 31 | 14 | 1.00E+18 | 0.6323 | | |
| L08 | 15* | −81.6226 | 1.2000 | 1.51633 | 64.065 |
| | 16* | 81.0116 | Variable interval 5 | | |
| L09 | 17 | −56.4186 | 1.2000 | 1.78470 | 26.291 |
| L10 | 18 | 37.1321 | 4.9153 | 1.49700 | 81.546 |
| | 19 | −31.7695 | Variable interval 6 | | |
| L11 | 20 | −18.8266 | 1.2000 | 1.71736 | 29.518 |
| L12 | 21 | 75.7102 | 7.1522 | 1.49700 | 81.546 |
| | 22 | −25.2641 | Variable interval 7 | | |
| L13 | 23 | 362.4527 | 5.9134 | 1.80810 | 22.761 |
| | 24 | −46.6249 | Variable interval 8 | | |
| L14 | 25 | 53.9553 | 6.2003 | 1.49700 | 81.546 |
| | 26 | −247.3750 | 5.1000 | | |
| 19 | 27 | 1.00E+18 | 35.5400 | 1.51680 | 64.198 |
| | 28 | 1.00E+18 | 0.0000 | | |
| 18 | 29 | 1.00E+18 | 11.8300 | | |

The variable interval 1, the variable interval 2, the variable interval 3, the variable interval 4, the variable interval 5, the variable interval 6, the variable interval 7, and the variable interval 8 during zooming are shown below.

| | Wide-angle end | Telephoto end |
|---|---|---|
| Variable interval 1 | 25.6400 | 2.1700 |
| Variable interval 2 | 13.1700 | 0.1200 |
| Variable interval 3 | 0.1000 | 0.0400 |
| Variable interval 4 | 0.1000 | 15.9600 |
| Variable interval 5 | 15.3300 | 1.2900 |
| Variable interval 6 | 1.5000 | 7.6500 |
| Variable interval 7 | 0.7700 | 0.1000 |
| Variable interval 8 | 0.1000 | 29.4000 |

Each aspherical coefficient is as follows.

| Surface number | 1 | 2 |
|---|---|---|
| R | −27.7287 | −36.0726 |
| Conic constant (K) | −10.1197 | −16.6002 |
| 4th-order coefficient | 5.012392E−05 | 5.452712E−05 |
| 6th-order coefficient | −1.125358E−07 | −1.064172E−07 |
| 8th-order coefficient | 1.882283E−10 | 1.297066E−10 |
| 10th-order coefficient | −1.928457E−13 | −3.292834E−14 |
| 12th-order coefficient | 1.116952E−16 | −8.346291E−17 |

-continued

| | | |
|---|---|---|
| 14th-order coefficient | −2.738335E−20 | 6.214545E−20 |

| Surface number | 15 | 16 |
|---|---|---|
| R | −81.6226 | 81.0116 |
| Conic constant (K) | −61.4600 | 12.1178 |
| 4th-order coefficient | −8.162257E+01 | 8.101161E+01 |
| 6th-order coefficient | −6.145997E+01 | 1.211776E+01 |
| 8th-order coefficient | 2.581047E−05 | 3.496185E−05 |
| 10th-order coefficient | −2.957443E−07 | −3.452129E−07 |
| 12th-order coefficient | 1.742436E−09 | 1.644266E−09 |

Here, the projection optical system 3C according to the embodiment satisfies the conditional expressions (1) to (8) similarly to the projection optical system 3A according to the first embodiment.

In the embodiment, variables are as below.

| | |
|---|---|
| Φ1 | 0.0468 (1/mm) |
| Φw | 0.0425 (1/mm) |

Therefore, Φ1/Φw=1.100, which satisfies the conditional expression (1).

In the embodiment, variables are as below.

| | |
|---|---|
| Fgs | −199.48 (mm) |
| Fw | 23.520 (mm) |

Therefore, Fgs/Fw=−8.481, which satisfies the conditional expression (2).

In the embodiment, variables are as below.

| | |
|---|---|
| Fw | 23.520 (mm) |
| Ft | 48.960 (mm) |
| LL | 126.000 (mm) |
| IH | 16.850 (mm) |

Therefore, (LL/IH)/(Ft/Fw)=3.592, which satisfies the conditional expression (3).

In the embodiment, variables are as below.

| | |
|---|---|
| Φw | 0.0425 (1/mm) |
| Φg1 | −0.029 (1/mm) |

Therefore, Φg1/Φw=−0.67, which satisfies the conditional expression (4).

In the embodiment, variables are as below.

| | |
|---|---|
| Φw | 0.0425 (1/mm) |
| Φg2 | 0.011 (1/mm) |

Therefore, Φg2/Φw=0.262, which satisfies the conditional expression (5).

In the embodiment, variables are as below.

| | |
|---|---|
| Φg2 | 0.011 (1/mm) |
| Φg3 | 0.007 (1/mm) |

Therefore, Φg2/Φg3=1.508, which satisfies the conditional expression (6).

In the embodiment, variables are as below.

| | |
|---|---|
| Nd1 | 1.800 |
| Nd2 | 1.801 |
| Vd1 | 29.845 |
| Vd2 | 25.425 |

Therefore, |(Nd1×Vd1)−(Nd2×Vd2)|=7.823, which satisfies the conditional expression (7).

In the embodiment, Nd2=1.801, which satisfies the conditional expression (8).

Effects

According to the embodiment, since the projection optical system 3C has a configuration similar to that of the projection optical system 3A according to the first embodiment, effects similar to those of the projection optical system 3A according to the first embodiment can be obtained.

Since the projection optical system 3C according to the embodiment satisfies the conditional expressions (1) to (8), effects similar to those of the projection optical system 3A according to the first embodiment can be obtained.

Figure 13:
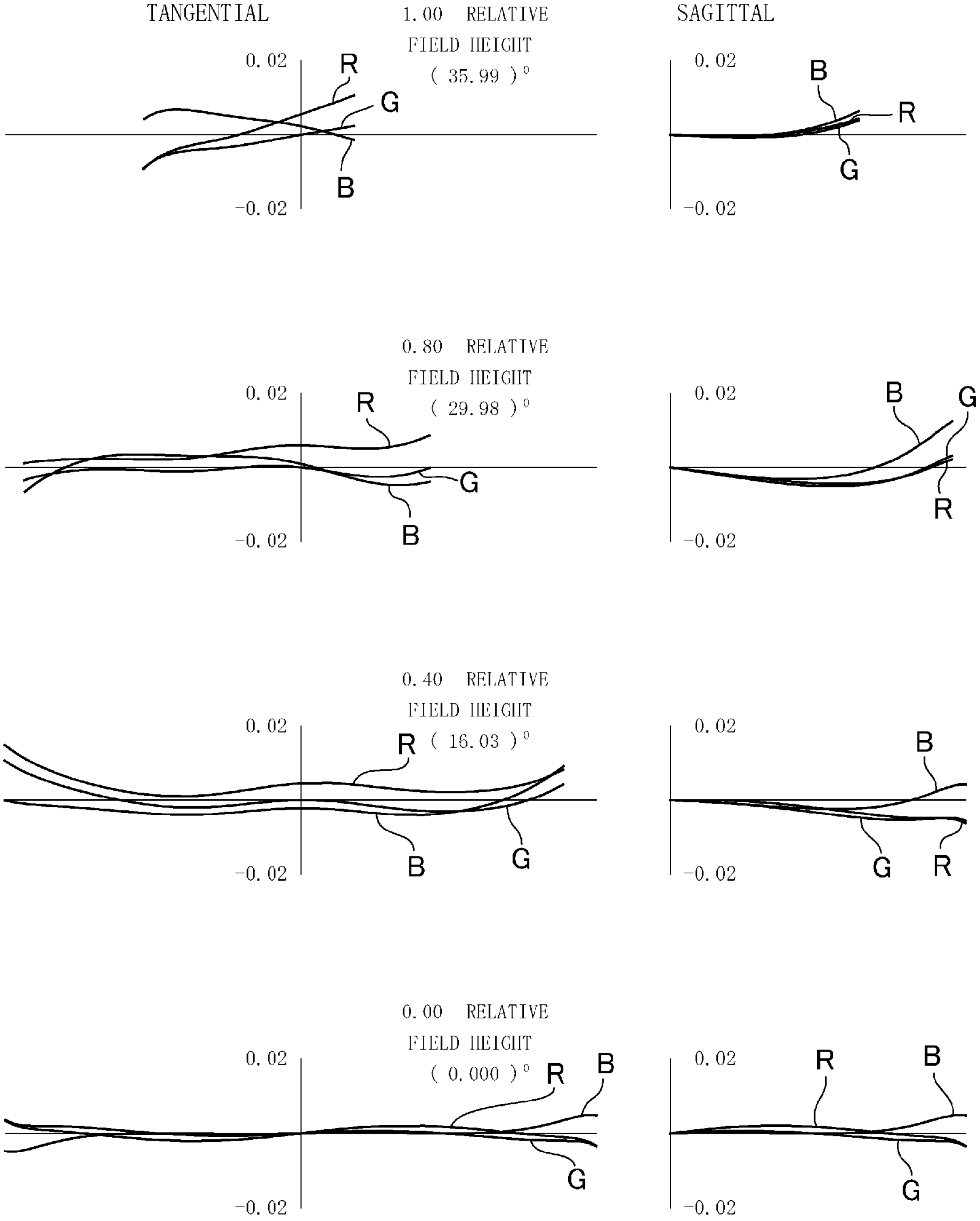
FIG. 13 is a diagram showing a coma aberration at a wide-angle end of the projection optical system according to the third embodiment.
Figure 14:
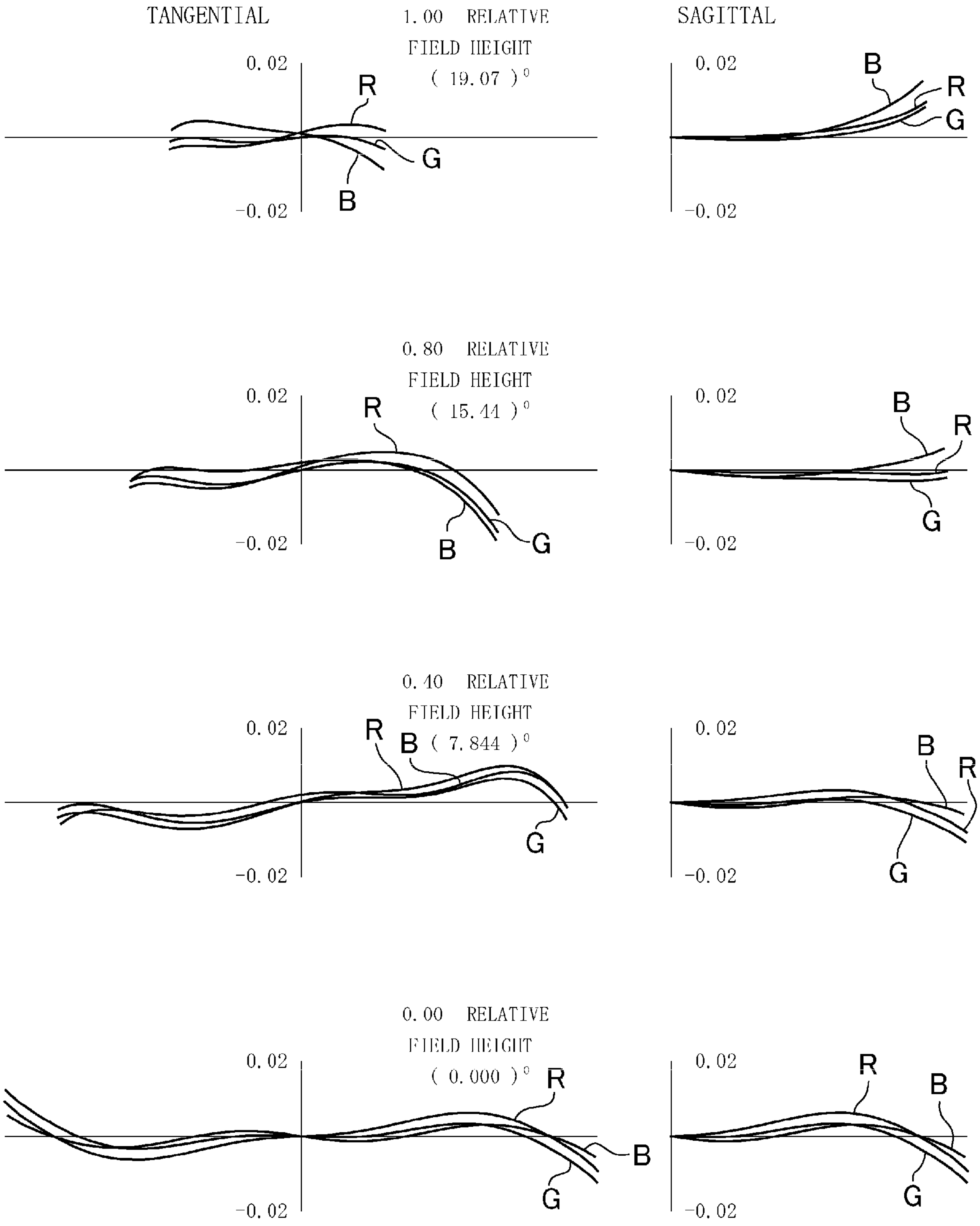
FIG. 14 is a diagram showing a coma aberration at a telephoto end of the projection optical system according to the third embodiment.
Figure 15:
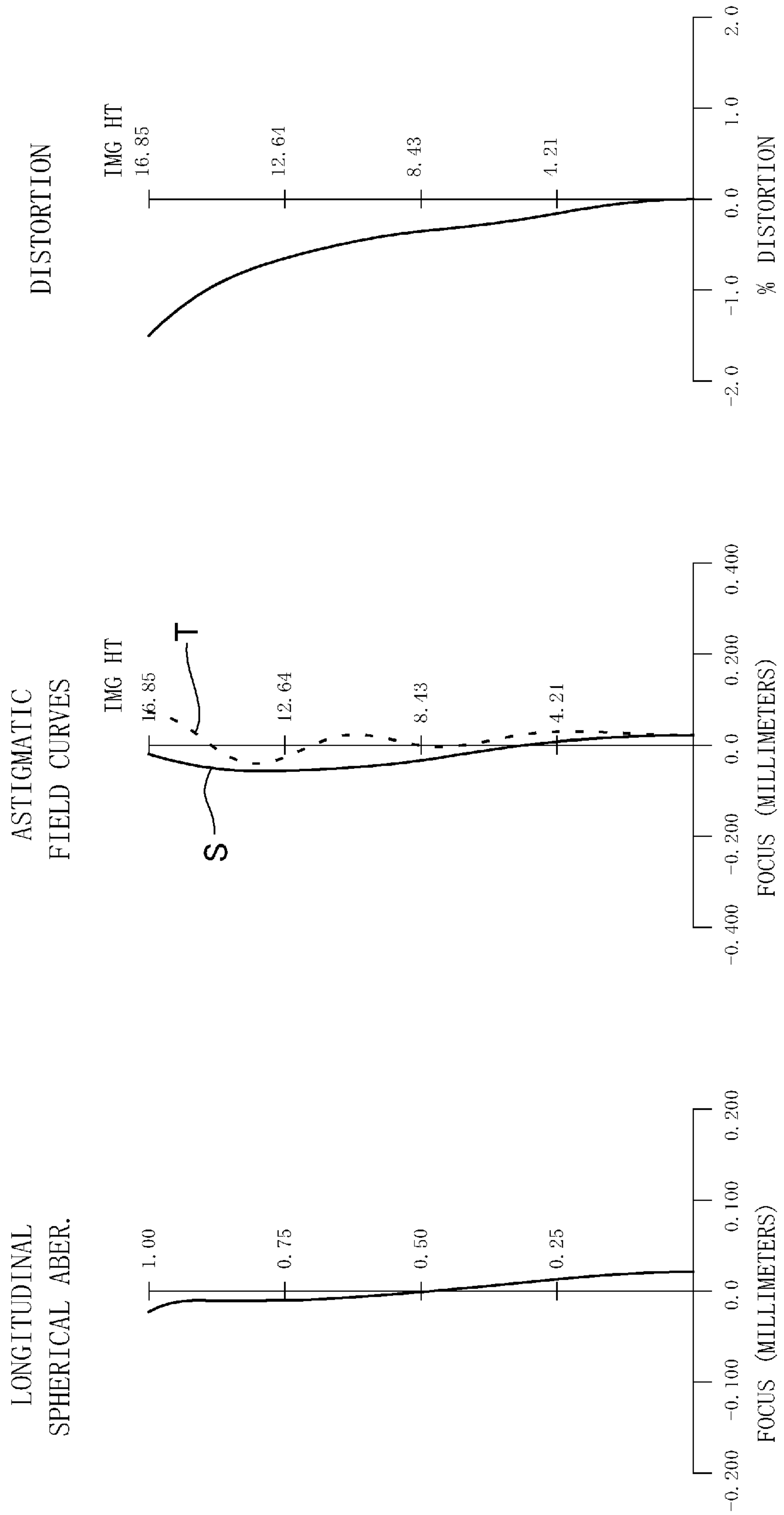
FIG. 15 is a diagram showing a spherical aberration, an astigmatism, and a distortion at the wide-angle end of the projection optical system according to the third embodiment.
Figure 16:
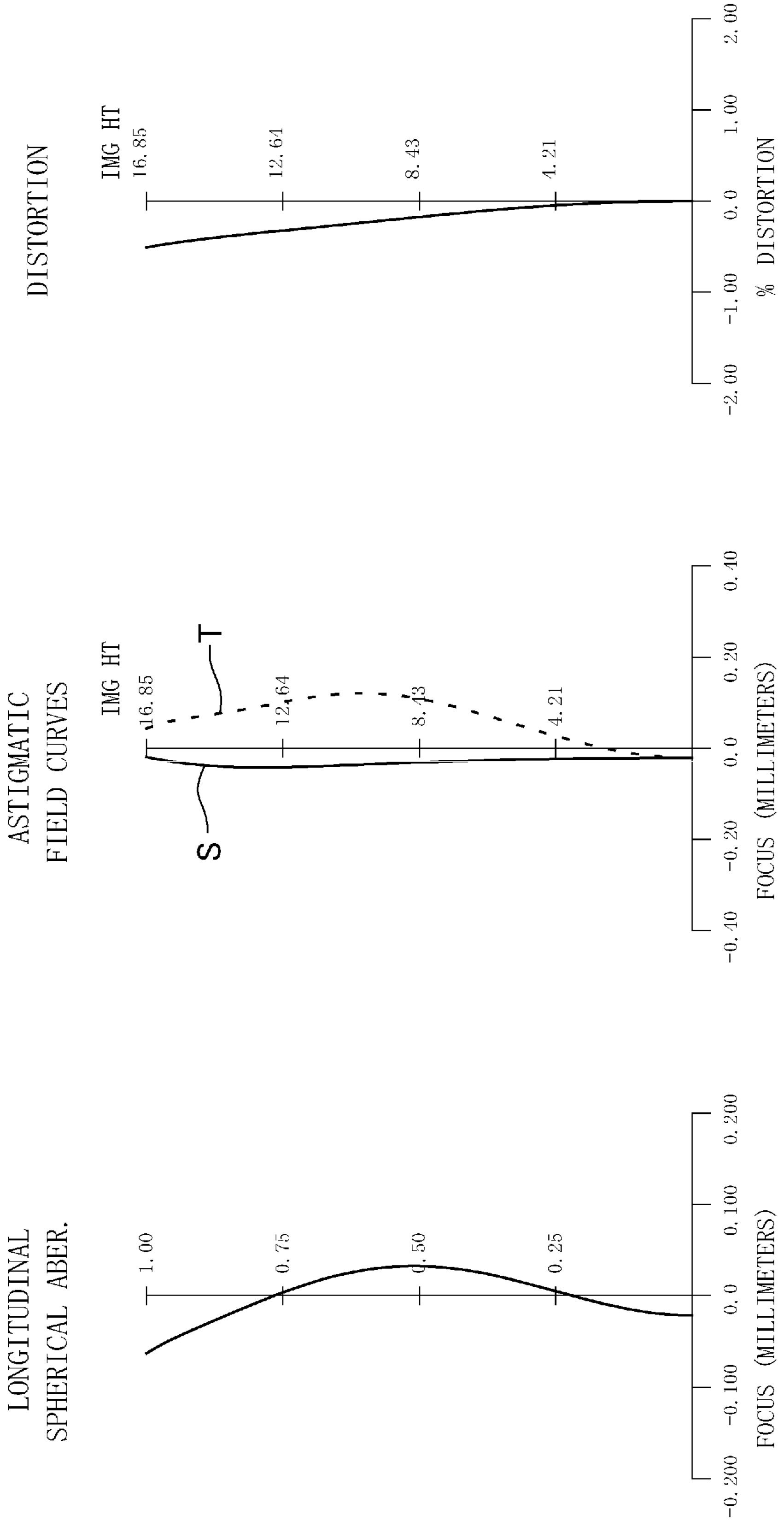
FIG. 16 is a diagram showing a spherical aberration, an astigmatism, and a distortion at the telephoto end of the projection optical system according to the third embodiment.

FIG. 13 is a diagram showing a coma aberration at a wide-angle end of the projection optical system 3C. FIG. 14 is a diagram showing a coma aberration at a telephoto end of the projection optical system 3C. FIG. 15 is a diagram showing a spherical aberration, an astigmatism, and a distortion at the wide-angle end of the projection optical system 3C. FIG. 16 is a diagram showing a spherical aberration, an astigmatism, and a distortion at the telephoto end of the projection optical system 3C.

A maximum value of the coma aberration in the projection optical system 3C is as follows.

| | Wide-angle end | Telephoto end |
|---|---|---|
| Maximum value of coma aberration (mm) | 0.0114 | 0.0198 |

As shown in FIGS. 14 to 16, various aberrations are prevented in the projection optical system 3C according to the embodiment. The coma aberration occurring in the projection optical system 3C according to the embodiment is favorably prevented.

Fourth Embodiment

Figure 17:
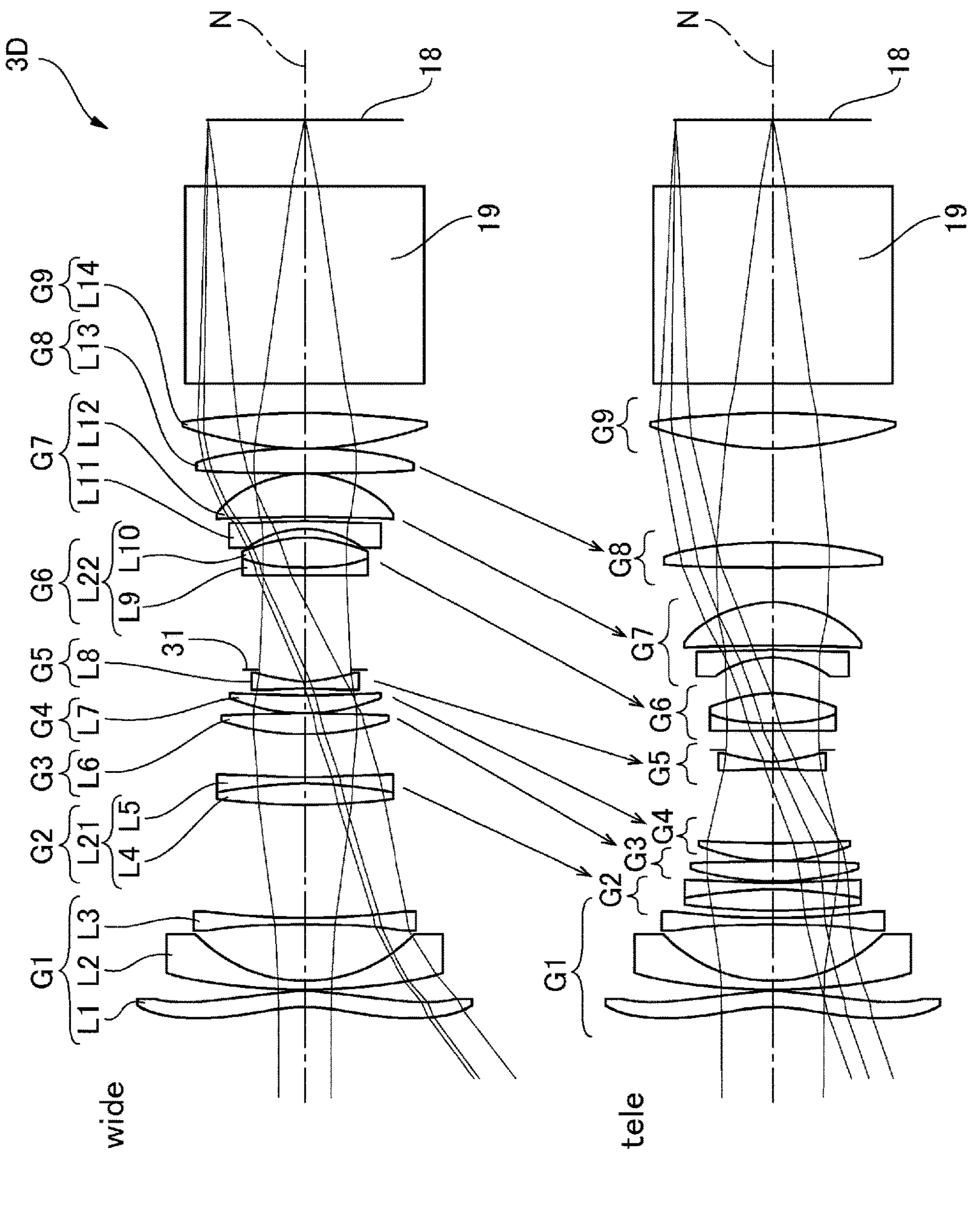
FIG. 17 is a ray diagram of a projection optical system according to a fourth embodiment.

FIG. 17 is a ray diagram of a projection optical system 3D according to a fourth embodiment. As shown in FIG. 17, the projection optical system 3D includes, in an order from a magnification side to a reduction side, the first lens group G1 having negative power, the second lens group G2 having positive power, the third lens group G3 having positive power, the fourth lens group G4 having positive power, the fifth lens group G5 having negative power, the sixth lens group G6 having positive power, the seventh lens group G7 having negative power, the eighth lens group G8 having positive power, and the ninth lens group G9 having positive power. The projection optical system 3D includes the aperture stop 31 disposed between the fifth lens group G5 and the sixth lens group G6.

The first lens group G1 includes three lenses L1 to L3. The lenses L1 to L3 are disposed in this order from the magnification side toward the reduction side. The lens L1 is made of resin. The lens L1 has negative power. The lens L2 has negative power. The lens L2 is a meniscus lens. The lens L2 has a convex shape on a magnification side surface thereof and a concave shape on a reduction side surface thereof. The lens L3 has negative power. The lens L3 has concave shapes on magnification side and reduction side surfaces thereof.

The second lens group G2 includes two lenses L4 to L5. The lenses L4 to L5 are disposed in this order from the magnification side toward the reduction side. The lens L4 (positive lens, first lens) has positive power. The lens L4 has convex shapes on magnification side and reduction side surfaces thereof. The lens L5 (negative lens, second lens) has negative power. The lens L5 has concave shapes on magnification side and reduction side surfaces thereof. The lens L4 and the lens L5 are cemented to form the cemented lens L21.

The third lens group G3 includes one lens L6. The lens L6 has positive power. The lens L6 has convex shapes on magnification side and reduction side surfaces thereof. The fourth lens group G4 includes one lens L7. The lens L7 has positive power. The lens L7 is a meniscus lens. The lens L7 has a convex shape on a magnification side surface thereof and a concave shape on a reduction side surface thereof. The fifth lens group G5 includes one lens L8. The lens L8 has negative power. The lens L8 has concave shapes on magnification side and reduction side surfaces thereof.

The sixth lens group G6 includes two lenses L9 to L10. The lenses L9 to L10 are disposed in this order from the magnification side toward the reduction side. The lens L9 has negative power. The lens L9 has concave shapes on magnification side and reduction side surfaces thereof. The lens L10 has positive power. The lens L10 has convex shapes on magnification side and reduction side surfaces thereof. The lens L9 and the lens L10 are cemented to form the cemented lens L22.

The seventh lens group G7 includes two lenses L11 to L12. The lenses L11 to L12 are disposed in this order from the magnification side to the reduction side. The lens L11 has negative power. The lens L11 has concave shapes on magnification side and reduction side surfaces thereof. The lens L12 has positive power. The lens L12 is a meniscus lens. The lens L12 has a concave shape on a magnification side surface thereof and a convex shape on a reduction side surface thereof.

The eighth lens group G8 includes one lens L13. The lens L13 has positive power. The lens L13 has convex shapes on magnification side and reduction side surfaces thereof. The ninth lens group G9 includes one lens L14. The lens L14 has positive power. The lens L14 has convex shapes on magnification side and reduction side surfaces thereof.

Here, the lens L1 (first aspherical lens) and the lens L8 (second aspherical lens) are aspherical lenses having aspherical shapes on magnification side and reduction side surfaces thereof. The lenses L2 to L7 and L9 to L14 are spherical lenses having spherical shapes on magnification side and reduction side surfaces thereof.

In the projection optical system 3D, the reduction side with respect to the lens L14 of the ninth lens group G9 is telecentric.

The projection optical system 3D is a zoom lens and changes an angle of view between a wide-angle end and a telephoto end. In the projection optical system 3D, during zooming, the first lens group G1 and the ninth lens group G9 are fixed, and the second lens group G2, the third lens group G3, the fourth lens group G4, the fifth lens group G5, the sixth lens group G6, the seventh lens group G7, and the eighth lens group G8 move along the optical axis N. The second lens group G2, the third lens group G3, the fourth lens group G4, the fifth lens group G5, the sixth lens group G6, the seventh lens group G7, and the eighth lens group G8 each move from the reduction side to the magnification side along the optical axis N when zooming from the wide-angle end to the telephoto end. In the embodiment, a zoom ratio is about 2.08.

When an F number of the projection optical system 3D is FNo, a focal length of the entire system at the wide-angle end is Fw, a focal length of the entire system at the telephoto end is Ft, a reciprocal of the focal length of the entire system at the wide-angle end is Φw, a zoom ratio is Z, a back focus is BF, a total lens length (a distance from an object side surface of the lens L1 to a reduction side surface of the lens L14) is LL, a maximum image height of the liquid crystal panel 18 is IH, a reciprocal of a composite focal length of all the lenses (the eight lenses L1 to L8), which are disposed on the magnification side with respect to the aperture stop 31, at the wide-angle end is Φ1, a focal length of the fifth lens group G5 having negative power and disposed at a position closest to the aperture stop 31 is Fgs, a reciprocal of a focal length of the first lens group G1 is Φg1, a reciprocal of a focal length of the second lens group G2 is Φg2, and a reciprocal of a focal length of the third lens group G3 is Φg3, data on the projection optical system 3D is as follows.

| FNo (wide-angle end to telephoto end) | 2.51-2.71 |
|---|---|
| Fw | 23.520 (mm) |
| Ft | 48.960 (mm) |
| Φw | 0.0425 (1/mm) |
| Z | 2.082 |
| BF | 52.470 (mm) |
| LL | 106.000 (mm) |
| IH | 16.850 (mm) |
| Φ1 | 0.0088 (1/mm) |
| Fgs | −41.45 (mm) |
| Φg1 | −0.028 (1/mm) |
| Φg2 | 0.006 (1/mm) |
| Φg3 | 0.017 (1/mm) |

Lens data on the projection optical system 3D is as follows. Surface numbers are assigned in an order from the magnification side to the reduction side. Reference numerals are those of the screen, the lens, the dichroic prism, and the liquid crystal panel. A surface whose surface number is attached with * is an aspherical surface. R is a radius of curvature. Dis an axial surface interval. Nd is a refractive index of a d-line. Vd is an Abbe number of the d-line. A unit of R and D is mm.

| Reference numeral | Surface number | R | D | Nd | Vd |
|---|---|---|---|---|---|
| S | 0 | 1.00E+18 | 2400.0000 | | |
| L01 | 1* | −37.5900 | 2.9386 | 1.53504 | 55.711 |
| | 2* | −37.6378 | 0.2000 | | |
| L02 | 3 | 102.5178 | 1.5000 | 1.49700 | 81.546 |
| | 4 | 26.1675 | 9.9699 | | |

-continued

| Reference numeral | Surface number | R | D | Nd | Vd |
|---|---|---|---|---|---|
| L03 | 5 | −176.3650 | 1.2000 | 1.92286 | 20.880 |
| | 6 | 136.1693 | Variable interval 1 | | |
| L04 | 7 | 133.3023 | 3.5524 | 1.78472 | 25.683 |
| | 8 | −86.5396 | 1.2000 | 1.54814 | 45.784 |
| L05 | 9 | 174.9044 | Variable interval 2 | | |
| L06 | 10 | 48.7519 | 3.5558 | 1.76200 | 40.100 |
| | 11 | −480.9260 | Variable interval 3 | | |
| L07 | 12 | 33.6528 | 3.3150 | 1.74400 | 44.786 |
| | 13 | 181.0526 | Variable interval 4 | | |
| L08 | 14* | −2153.6600 | 1.3198 | 1.51633 | 64.065 |
| 31 | 15* | 21.6959 | Variable interval 5 | | |
| | 16 | 1.00E+18 | 17.3793 | | |
| L09 | 17 | −764.7850 | 1.2000 | 1.78472 | 25.683 |
| L10 | 18 | 29.9333 | 5.3952 | 1.49700 | 81.546 |
| | 19 | −29.0893 | Variable interval 6 | | |
| L11 | 20 | −17.0558 | 1.2000 | 1.75520 | 27.512 |
| L12 | 21 | −313.5510 | 0.8571 | | |
| | 22 | −453.2870 | 7.7483 | 1.49700 | 81.546 |
| L13 | 23 | −20.3431 | Variable interval 7 | | |
| | 24 | 506.8248 | 4.5014 | 1.80810 | 22.761 |
| L14 | 25 | −71.6515 | Variable interval 8 | | |
| | 26 | 63.2612 | 6.0043 | 1.49700 | 81.546 |
| 19 | 27 | −143.7790 | 5.1000 | | |
| | 28 | 1.00E+18 | 35.5400 | 1.51680 | 64.198 |
| 18 | 29 | 1.00E+18 | 0.0000 | | |
| | 30 | 1.00E+18 | 11.8300 | | |

The variable interval 1, the variable interval 2, the variable interval 3, the variable interval 4, the variable interval 5, the variable interval 6, the variable interval 7, and the variable interval 8 during zooming are shown below.

| | Wide-angle end | Telephoto end |
|---|---|---|
| Variable interval 1 | 20.4600 | 1.2000 |
| Variable interval 2 | 7.7200 | 0.1000 |
| Variable interval 3 | 0.1000 | 0.1000 |
| Variable interval 4 | 0.4100 | 12.4300 |
| Variable interval 5 | 14.6700 | 1.0600 |
| Variable interval 6 | 1.5800 | 6.6100 |
| Variable interval 7 | 0.1000 | 6.2500 |
| Variable interval 8 | 0.1000 | 17.3900 |

Each aspherical coefficient is as follows.

| Surface number | 1 | 2 |
|---|---|---|
| R | −37.5900 | −37.6378 |
| Conic constant (K) | −0.9110 | 0.3977 |
| 4th-order coefficient | 3.744953E−05 | 3.858073E−05 |
| 6th-order coefficient | −6.844128E−08 | −6.080385E−08 |
| 8th-order coefficient | 1.077486E−10 | 8.596848E−11 |
| 10th-order coefficient | −1.141392E−13 | −6.442473E−14 |

-continued

| | | |
|---|---|---|
| 12th-order coefficient | 7.700598E−17 | 2.501641E−17 |
| 14th-order coefficient | −2.482523E−20 | −2.896829E−21 |

| Surface number | 14 | 15 |
|---|---|---|
| R | −2153.6600 | 21.6959 |
| Conic constant (K) | 11601.8700 | 0.5401 |
| 4th-order coefficient | −7.797918E−05 | −9.575082E−05 |
| 6th-order coefficient | 1.308553E−06 | 1.264889E−06 |
| 8th-order coefficient | −1.420514E−08 | −1.254840E−08 |
| 10th-order coefficient | 8.389056E−11 | 5.097665E−11 |
| 12th-order coefficient | −1.927657E−13 | |

Here, the projection optical system 3D according to the embodiment satisfies the conditional expressions (1) to (8) similarly to the projection optical system 3A according to the first embodiment.

In the embodiment, variables are as below.

| | |
|---|---|
| Φ1 | 0.0088 (1/mm) |
| Φw | 0.0425 (1/mm) |

Therefore, Φ1/Φw=0.206, which satisfies the conditional expression (1).

In the embodiment, variables are as below.

| | |
|---|---|
| Fgs | −41.45 (mm) |
| Fw | 23.520 (mm) |

Therefore, Fgs/Fw=−1.762, which satisfies the conditional expression (2).

In the embodiment, variables are as below.

| | |
|---|---|
| Fw | 23.520 (mm) |
| Ft | 48.960 (mm) |
| LL | 106.000 (mm) |
| IH | 16.850 (mm) |

Therefore, (LL/IH)/(Ft/Fw)=3.022, which satisfies the conditional expression (3).

In the embodiment, variables are as below.

| | |
|---|---|
| Φw | 0.0425 (1/mm) |
| Φg1 | −0.028 (1/mm) |

Therefore, Φg1/Φw=−0.67, which satisfies the conditional expression (4).

In the embodiment, variables are as below.

| | |
|---|---|
| Φw | 0.0425 (1/mm) |
| Φg2 | 0.006 (1/mm) |

Therefore, Φg2/Φw=0.131, which satisfies the conditional expression (5).

In the embodiment, variables are as below.

| | |
|---|---|
| Φq2 | 0.006 (1/mm) |
| Φg3 | 0.017 (1/mm) |

Therefore, Φg2/Φg3=0.324, which satisfies the conditional expression (6).

In the embodiment, variables are as below.

| | |
|---|---|
| Nd1 | 1.785 |
| Nd2 | 1.548 |
| Vd1 | 25.683 |
| Vd2 | 45.784 |

Therefore, |(Nd1×Vd1)−(Nd2×Vd2)|=25.043, which satisfies the conditional expression (7).

In the embodiment, Nd2=1.548, which satisfies the conditional expression (8).

Effects

According to the embodiment, since the projection optical system 3D has a configuration similar to that of the projection optical system 3A according to the first embodiment, effects similar to those of the projection optical system 3A according to the first embodiment can be obtained.

Since the projection optical system 3D according to the embodiment satisfies the conditional expressions (1) to (8), effects similar to those of the projection optical system 3A according to the first embodiment can be obtained.

Figure 18:
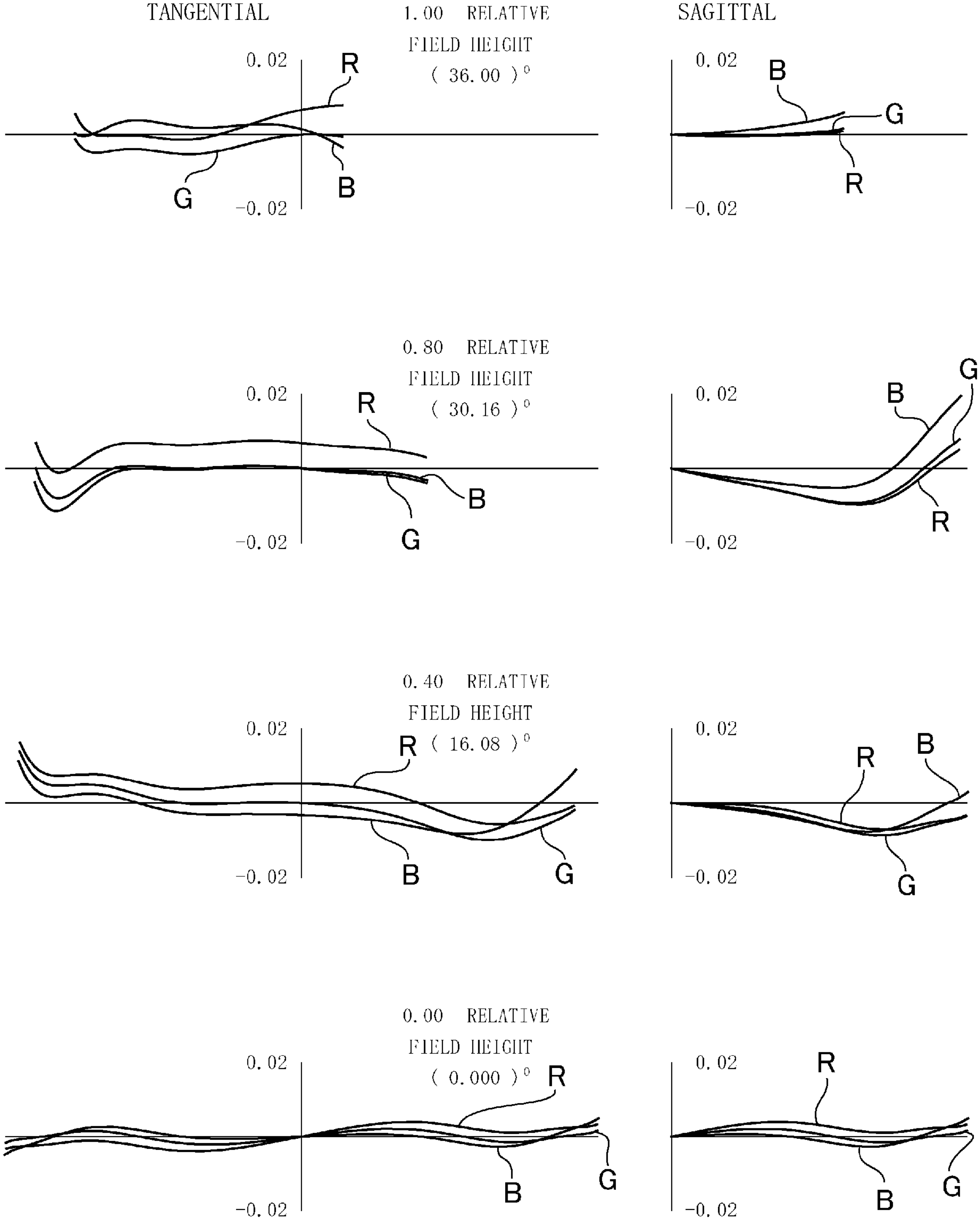
FIG. 18 is a diagram showing a coma aberration at a wide-angle end of the projection optical system according to the fourth embodiment.
Figure 19:
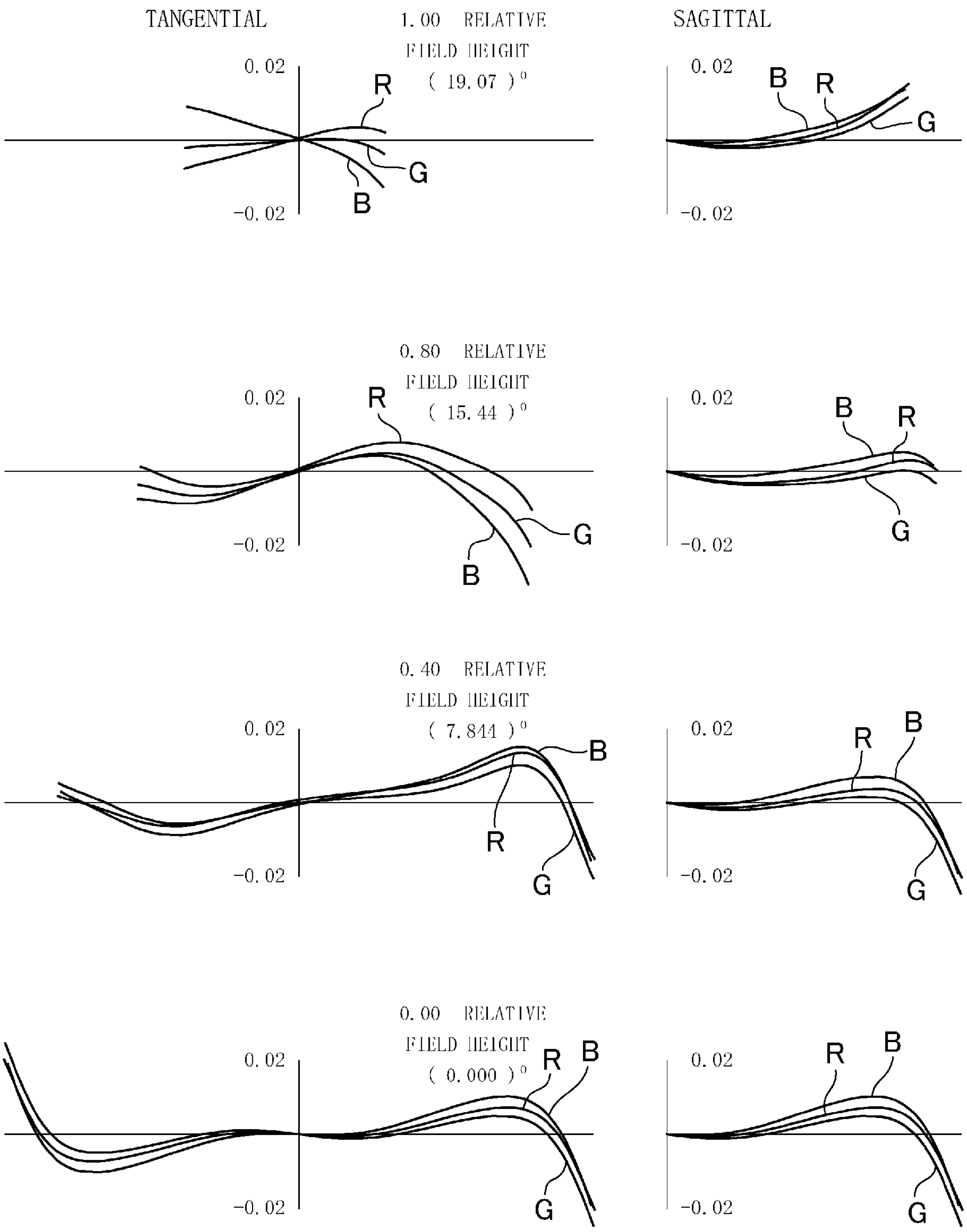
FIG. 19 is a diagram showing a coma aberration at a telephoto end of the projection optical system according to the fourth embodiment.
Figure 20:
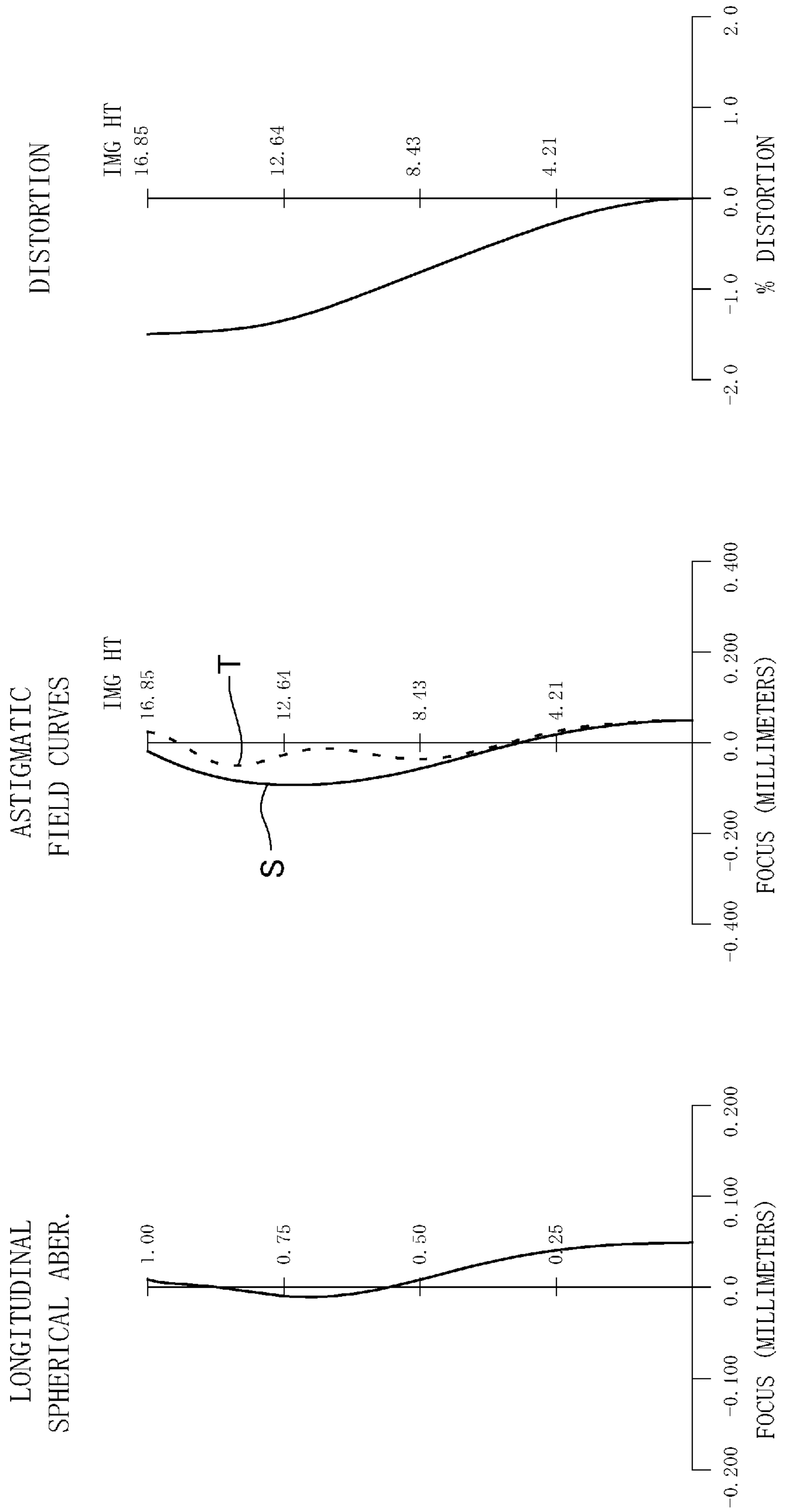
FIG. 20 is a diagram showing a spherical aberration, an astigmatism, and a distortion at the wide-angle end of the projection optical system according to the fourth embodiment.
Figure 21:
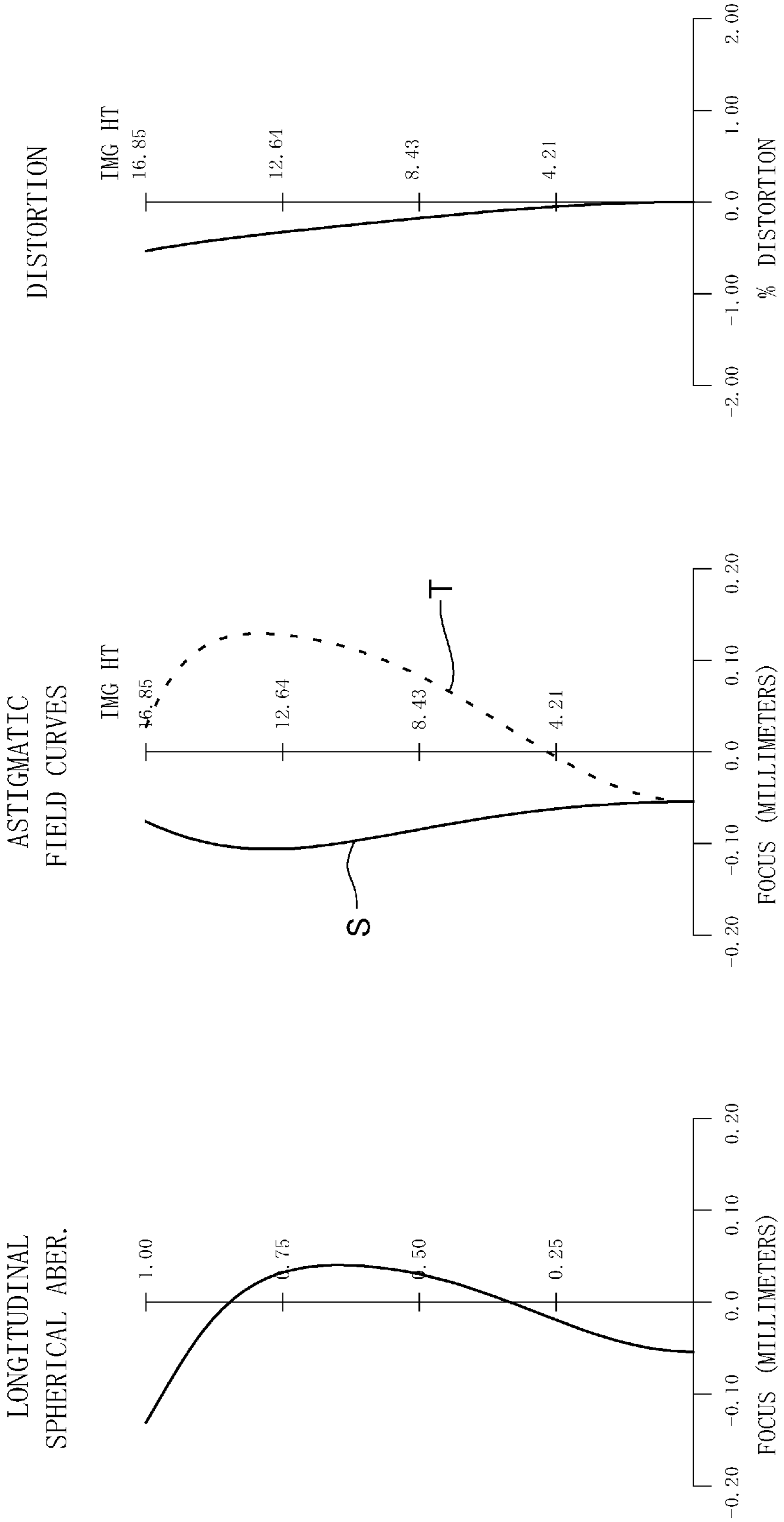
FIG. 21 is a diagram showing a spherical aberration, an astigmatism, and a distortion at the telephoto end of the projection optical system according to fourth embodiment.

FIG. 18 is a diagram showing a coma aberration at a wide-angle end of the projection optical system 3D. FIG. 19 is a diagram showing a coma aberration at a telephoto end of the projection optical system 3D. FIG. 20 is a diagram showing a spherical aberration, an astigmatism, and a distortion at the wide-angle end of the projection optical system 3D. FIG. 21 is a diagram showing a spherical aberration, an astigmatism, and a distortion at the telephoto end of the projection optical system 3D.

A maximum value of the coma aberration in the projection optical system 3D is as follows.

| | Wide-angle end | Telephoto end |
|---|---|---|
| Maximum value of coma aberration (mm) | 0.0140 | 0.0250 |

As shown in FIGS. 18 to 21, various aberrations are prevented in the projection optical system 3D according to the embodiment. The coma aberration occurring in the projection optical system 3D according to the embodiment is favorably prevented.

Fifth Embodiment

Figure 22:
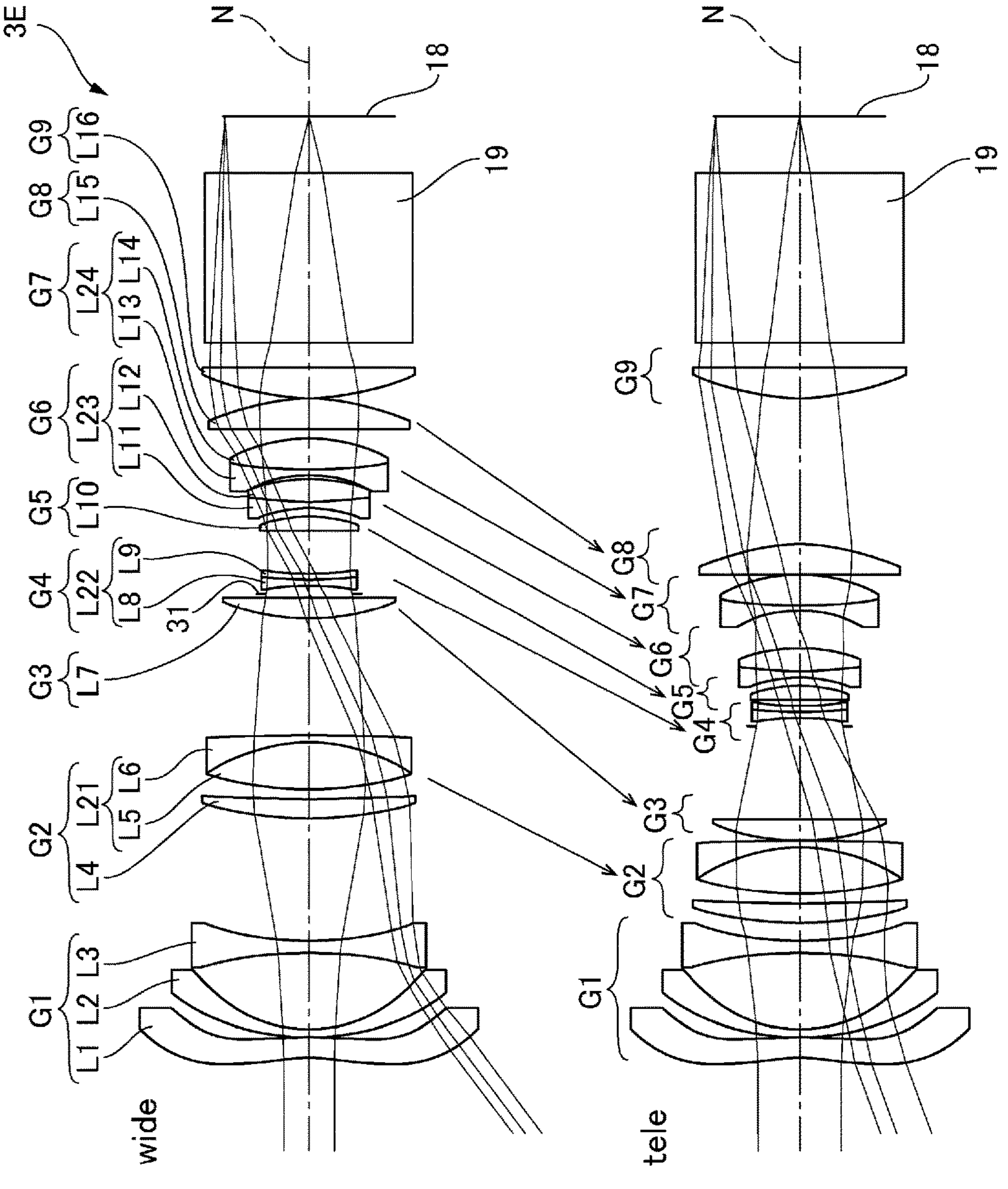
FIG. 22 is a ray diagram of a projection optical system according to a fifth embodiment.

FIG. 22 is a ray diagram of a projection optical system 3E according to a fifth embodiment. As shown in FIG. 22, the projection optical system 3E includes, in an order from a magnification side to a reduction side, the first lens group G1 having negative power, the second lens group G2 having positive power, the third lens group G3 having positive power, the fourth lens group G4 having negative power, the fifth lens group G5 having positive power, the sixth lens group G6 having negative power, the seventh lens group G7 having negative power, the eighth lens group G8 having positive power, and the ninth lens group G9 having positive power. The projection optical system 3E includes the aperture stop 31 disposed between the third lens group G3 and the fourth lens group G4.

The first lens group G1 includes three lenses L1 to L3. The lenses L1 to L3 are disposed in this order from the magnification side toward the reduction side. The lens L1 is made of resin. The lens L1 has negative power. The lens L2 has negative power. The lens L2 is a meniscus lens. The lens L2 has a convex shape on a magnification side surface thereof and a concave shape on a reduction side surface thereof. The lens L3 has negative power. The lens L3 has concave shapes on magnification side and reduction side surfaces thereof.

The second lens group G2 includes three lenses L4 to L6. The lenses L4 to L6 are disposed in this order from the magnification side to the reduction side. The lens L4 has positive power. The lens L4 is a meniscus lens. The lens L4 has a convex shape on a magnification side surface thereof and a concave shape on a reduction side surface thereof. The lens L5 (positive lens, first lens) has positive power. The lens L5 has convex shapes on magnification side and reduction side surfaces thereof. The lens L6 (negative lens, second lens) has negative power. The lens L6 is a meniscus lens. The lens L6 has a concave shape on a magnification side surface thereof and a convex shape on a reduction side surface thereof. The lens L5 and the lens L6 are cemented to form a cemented lens L21.

The third lens group G3 includes one lens L7. The lens L7 has positive power. The lens L7 has convex shapes on magnification side and reduction side surfaces thereof.

The fourth lens group G4 includes two lenses L8 to L9. The lenses L8 to L9 are disposed in this order from the magnification side toward the reduction side. The lens L8 has negative power. The lens L8 has concave shapes on magnification side and reduction side surfaces thereof. The lens L9 has positive power. The lens L9 is a meniscus lens. The lens L9 has a convex shape on a magnification side surface thereof and a concave shape on a reduction side surface thereof. The lens L8 and the lens L9 are cemented to form a cemented lens L22.

The fifth lens group G5 includes one lens L10. The lens L10 has positive power. The lens L10 has convex shapes on magnification side and reduction side surfaces thereof.

The sixth lens group G6 includes two lenses L11 to L12. The lenses L11 to L12 are disposed in this order from the magnification side toward the reduction side. The lens L11 has negative power. The lens L11 has concave shapes on magnification side and reduction side surfaces thereof. The lens L12 has positive power. The lens L12 has convex shapes on magnification side and reduction side surfaces thereof. The lens L11 and the lens L12 are cemented to form a cemented lens L23.

The seventh lens group G7 includes two lenses L13 to L14. The lenses L13 to L14 are disposed in this order from the magnification side to the reduction side. The lens L13 has negative power. The lens L13 has concave shapes on magnification side and reduction side surfaces thereof. The lens L14 has positive power. The lens L14 is a meniscus lens. The lens L14 has a concave shape on a magnification side surface thereof and a convex shape on a reduction side surface thereof. The lens L13 and the lens L14 are cemented to form a cemented lens L24.

The eighth lens group G8 includes one lens L15. The lens L15 has positive power. The lens L15 has convex shapes on magnification side and reduction side surfaces thereof. The ninth lens group G9 includes one lens L16. The lens L16 has positive power. The lens L16 has convex shapes on magnification side and reduction side surfaces thereof.

Here, the lens L1 (first aspherical lens) is an aspherical lens having aspherical shapes on magnification side and reduction side surfaces thereof. The lens L8 (second aspherical lens) is an aspherical lens having an aspherical shape on a magnification side surface thereof and a spherical shape on a reduction side surface thereof. The lenses L2 to L7 and L9 to L16 are spherical lenses having spherical shapes on magnification side and reduction side surfaces thereof.

In the projection optical system 3E, a reduction side from the lens L16 of the ninth lens group G9 is telecentric.

The projection optical system 3E is a zoom lens and changes an angle of view between a wide-angle end and a telephoto end. In the projection optical system 3E, during zooming, the first lens group G1 and the ninth lens group G9 are fixed, and the second lens group G2, the third lens group G3, the fourth lens group G4, the fifth lens group G5, the sixth lens group G6, the seventh lens group G7, and the eighth lens group G8 move along the optical axis N. The second lens group G2, the third lens group G3, the fourth lens group G4, the fifth lens group G5, the sixth lens group G6, the seventh lens group G7, and the eighth lens group G8 each move from the reduction side to the magnification side along the optical axis N when zooming from the wide-angle end to the telephoto end. In the embodiment, a zoom ratio is about 2.08.

When an F number of the projection optical system 3E is FNo, a focal length of the entire system at the wide-angle end is Fw, a focal length of the entire system at the telephoto end is Ft, a reciprocal of the focal length of the entire system at the wide-angle end is Φw, a zoom ratio is Z, a back focus is BF, a total lens length (a distance from an object side surface of the lens L1 to a reduction side surface of the lens L16) is LL, a maximum image height of the liquid crystal panel 18 is IH, a reciprocal of a composite focal length of all the lenses (the seven lenses L1 to L7), which are disposed on the magnification side with respect to the aperture stop 31, at the wide-angle end is Φ1, a focal length of the fourth lens group G4 having negative power and disposed at a position closest to the aperture stop 31 is Fgs, a reciprocal of a focal length of the first lens group G1 is Φg1, a reciprocal of a focal length of the second lens group G2 is Φg2, and a reciprocal of a focal length of the third lens group G3 is Φg3, data on the projection optical system 3E is as follows.

| FNo (wide-angle end to telephoto end) | 2.28-2.91 |
|---|---|
| Fw | 23.520 (mm) |
| Ft | 48.960 (mm) |
| Φw | 0.0425 (1/mm) |
| Z | 2.082 |
| BF | 52.470 (mm) |
| LL | 143.000 (mm) |
| IH | 16.850 (mm) |
| Φ1 | 0.0387 (1/mm) |
| Fgs | −35.00 (mm) |
| Φg1 | −0.032 (1/mm) |
| Φg2 | 0.020 (1/mm) |
| Φg3 | 0.015 (1/mm) |

Lens data on the projection optical system 3E is as follows. Surface numbers are assigned in an order from the magnification side to the reduction side. Reference numerals are those of the screen, the lens, the dichroic prism, and the liquid crystal panel. A surface whose surface number is attached with * is an aspherical surface. R is a radius of curvature. Dis an axial surface interval. Nd is a refractive index of a d-line. Vd is an Abbe number of the d-line. A unit of R and D is mm.

| Reference numeral | Surface number | R | D | Nd | Vd |
|---|---|---|---|---|---|
| S | 0 | 1.00E+18 | 2400.0000 | | |
| L01 | 1* | −33.4535 | 4.0000 | 1.53504 | 55.711 |
| | 2* | −53.5480 | 0.1000 | | |
| L02 | 3 | 46.0444 | 1.5000 | 1.48749 | 70.236 |
| | 4 | 27.9460 | 15.6877 | | |
| L03 | 5 | −83.8553 | 2.5000 | 1.53956 | 65.476 |
| | 6 | 61.3978 | Variable interval 1 | | |
| L04 | 7 | 75.5415 | 4.0000 | 1.75520 | 27.580 |
| | 8 | 324.6645 | 1.9333 | | |
| L05 | 9 | 66.0612 | 9.8519 | 1.74792 | 36.693 |
| L06 | 10 | −34.4357 | 1.2000 | 1.73153 | 28.605 |
| | 11 | −640.5990 | Variable interval 2 | | |
| L07 | 12 | 43.4804 | 4.5597 | 1.62519 | 59.380 |
| | 13 | −1226.5500 | Variable interval 3 | | |
| 31 | 14 | 1.00E+18 | 1.7850 | | |
| L08 | 15* | −42.8393 | 1.2000 | 1.59648 | 61.622 |
| L09 | 16 | 101.4728 | 1.2000 | 1.75066 | 32.612 |
| | 17 | 47.6318 | Variable interval 4 | | |
| L10 | 18 | 504.7599 | 3.0388 | 1.62365 | 59.680 |
| | 19 | −27.0290 | Variable interval 5 | | |
| L11 | 20 | −25.1752 | 1.2000 | 1.72466 | 29.340 |
| L12 | 21 | 78.6625 | 4.7496 | 1.49700 | 81.546 |
| | 22 | −31.0348 | Variable interval 6 | | |
| L13 | 23 | −25.4327 | 1.2000 | 1.73043 | 28.656 |
| L14 | 24 | 90.2479 | 6.3580 | 1.49700 | 81.546 |
| | 25 | −33.2087 | Variable interval 7 | | |
| L15 | 26 | 646.3255 | 6.3249 | 1.80810 | 22.761 |
| | 27 | −44.5524 | Variable interval 8 | | |
| L16 | 28 | 4.77E+01 | 6.3806 | 1.49700 | 81.546 |
| | 29 | 15642.8400 | 5.1000 | | |
| 19 | 30 | 1.00E+18 | 35.5400 | 1.516798 | 64.1983 |
| | 31 | 1.00E+18 | 0.0000 | | |
| 18 | 32 | 1.00E+18 | 11.8300 | | |

The variable interval 1, the variable interval 2, the variable interval 3, the variable interval 4, the variable interval 5, the variable interval 6, the variable interval 7, and the variable interval 8 during zooming are shown below.

| | Wide-angle end | Telephoto end |
|---|---|---|
| Variable interval 1 | 25.6714 | 4.0119 |
| Variable interval 2 | 24.3243 | 0.4000 |
| Variable interval 3 | 0.7474 | 19.1510 |
| Variable interval 4 | 8.9293 | 1.0000 |
| Variable interval 5 | 1.7324 | 1.8014 |
| Variable interval 6 | 0.8000 | 7.7663 |
| Variable interval 7 | 1.9256 | 0.1000 |
| Variable interval 8 | 0.1000 | 30.0000 |

Each aspherical coefficient is as follows.

| Surface number | 1 | 2 | 15 |
|---|---|---|---|
| R | −33.4535 | −53.5480 | −42.8393 |
| Conic constant (K) | −10.5858 | −28.8817 | 4.5397 |
| 4th-order coefficient | 2.629052E−05 | 3.020054E−05 | 8.022886E−06 |
| 6th-order coefficient | −4.045480E−08 | −3.417157E−08 | 6.897732E−10 |
| 8th-order coefficient | 4.769098E−11 | 1.457474E−11 | 2.218207E−10 |
| 10th-order coefficient | −3.557968E−14 | 3.353833E−14 | −9.494996E−13 |
| 12th-order coefficient | 1.530504E−17 | −5.673105E−17 | −9.108162E−26 |
| 14th-order coefficient | −2.368508E−21 | 3.240518E−20 | |

Here, the projection optical system 3E according to the embodiment satisfies the conditional expressions (1) to (8) similarly to the projection optical system 3A according to the first embodiment.

In the embodiment, variables are as below.

| | |
|---|---|
| Φ1 | 0.0387 (1/mm) |
| Φw | 0.0425 (1/mm) |

Therefore, Φ1/Φw=0.911, which satisfies the conditional expression (1).

In the embodiment, variables are as below.

| | |
|---|---|
| Fgs | −35.00 (mm) |
| Fw | 23.520 (mm) |

Therefore, Fgs/Fw=−1.488, which satisfies the conditional expression (2).

In the embodiment, variables are as below.

| | |
|---|---|
| Fw | 23.520 (mm) |
| Ft | 48.960 (mm) |
| LL | 143.000 (mm) |
| IH | 16.850 (mm) |

Therefore, (LL/IH)/(Ft/Fw)=4.077, which satisfies the conditional expression (3).

In the embodiment, variables are as below.

| | |
|---|---|
| Φw | 0.0425 (1/mm) |
| Φg1 | −0.032 (1/mm) |

Therefore, Φg1/Φw=−0.75, which satisfies the conditional expression (4).

In the embodiment, variables are as below.

| | |
|---|---|
| Φw | 0.0425 (1/mm) |
| Φg2 | 0.020 (1/mm) |

Therefore, Φg2/Φw=0.473, which satisfies the conditional expression (5).

In the embodiment, variables are as below.

| | |
|---|---|
| Φg2 | 0.020 (1/mm) |
| Φg3 | 0.015 (1/mm) |

Therefore, Φg2/Φg3=1.346, which satisfies the conditional expression (6).

In the embodiment, variables are as below.

| | |
|---|---|
| Nd1 | 1.748 |
| Nd2 | 1.732 |
| Vd1 | 36.693 |
| Vd2 | 28.605 |

Therefore, |(Nd1×Vd1)−(Nd2×Vd2)|=14.606, which satisfies the conditional expression (7).

In the embodiment, Nd2=1.732, which satisfies the conditional expression (8).

Effects

According to the embodiment, since the projection optical system 3E has a configuration similar to that of the projection optical system 3A according to the first embodiment, effects similar to those of the projection optical system 3A according to the first embodiment can be obtained.

Since the projection optical system 3E according to the embodiment satisfies the conditional expressions (1) to (8), effects similar to those of the projection optical system 3A according to the first embodiment can be obtained.

Figure 23:
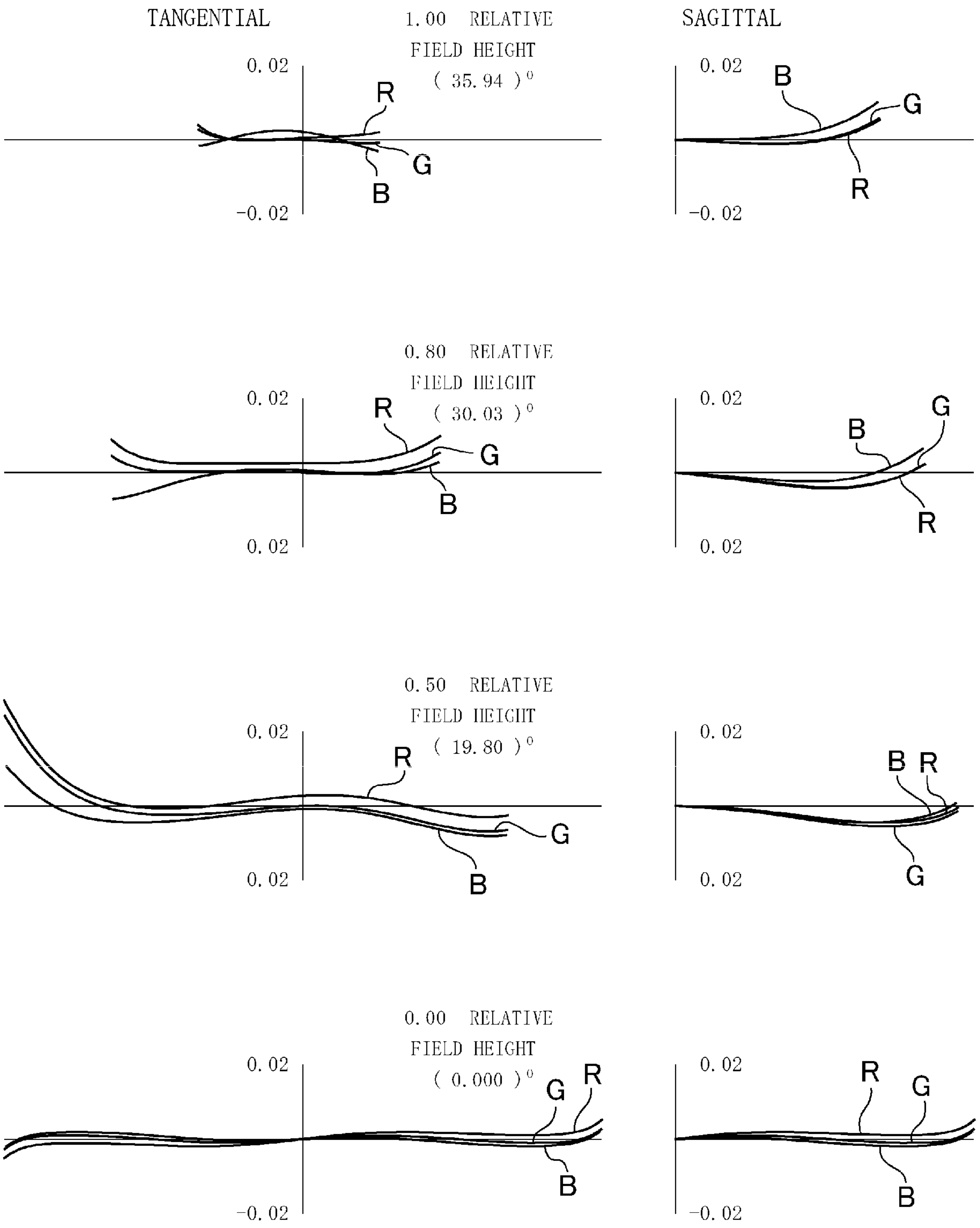
FIG. 23 is a diagram showing a coma aberration at a wide-angle end of the projection optical system according to the fifth embodiment.
Figure 24:
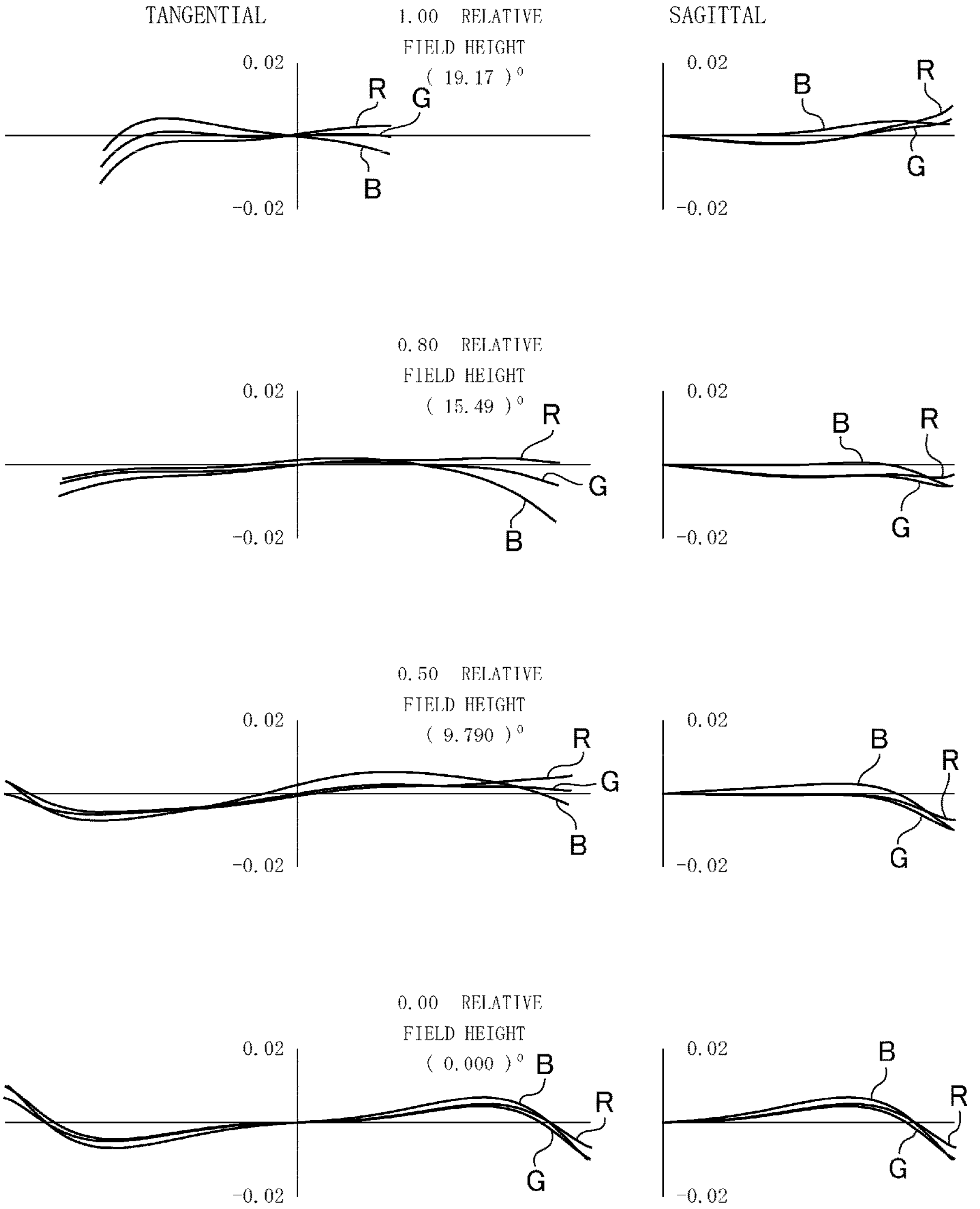
FIG. 24 is a diagram showing a coma aberration at a telephoto end of the projection optical system according to the fifth embodiment.
Figure 25:
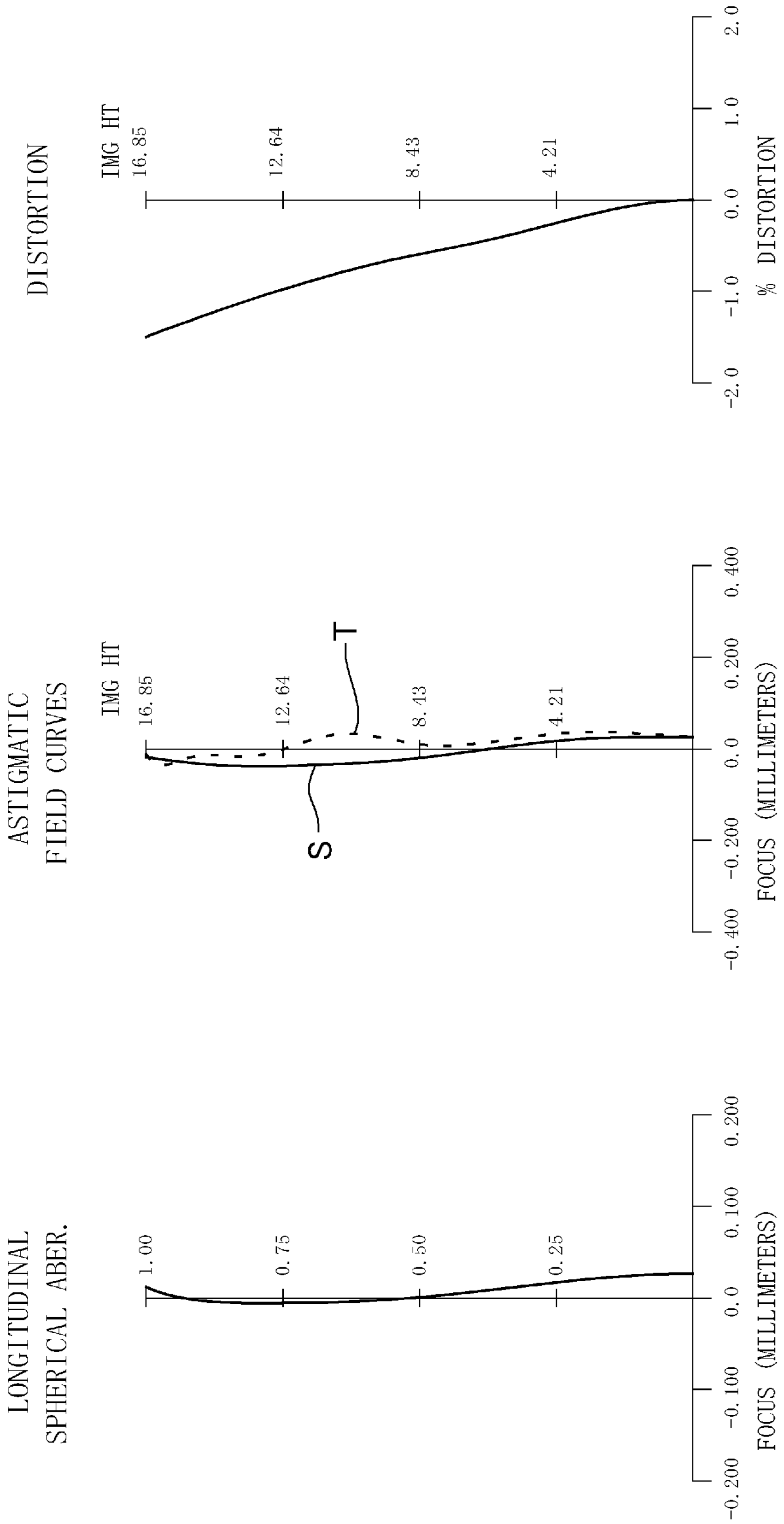
FIG. 25 is a diagram showing a spherical aberration, an astigmatism, and a distortion at the wide-angle end of the projection optical system according to the fifth embodiment.
Figure 26:
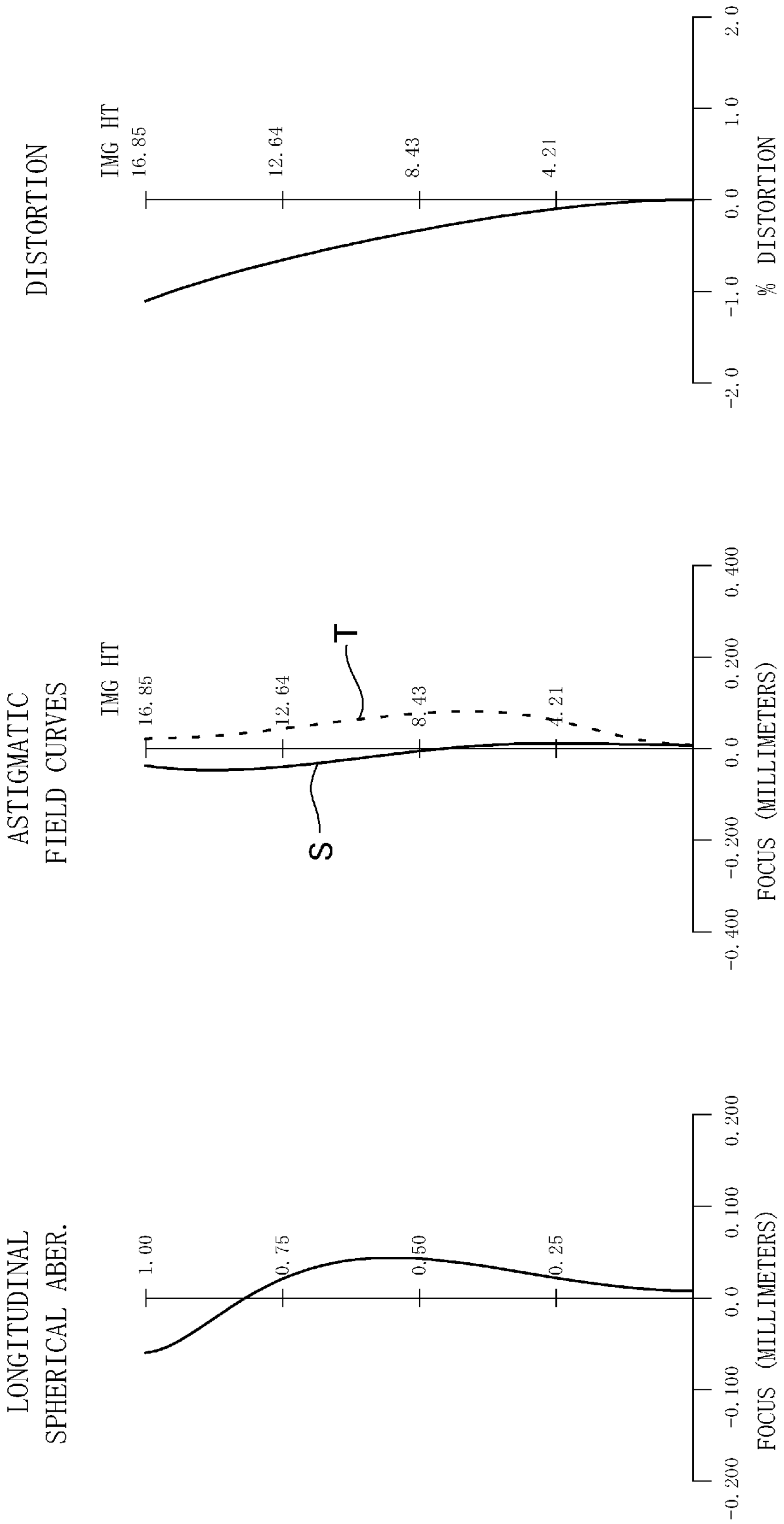
FIG. 26 is a diagram showing a spherical aberration, an astigmatism, and a distortion at the telephoto end of the projection optical system according to the fifth embodiment.

FIG. 23 is a diagram showing a coma aberration at a wide-angle end of the projection optical system 3E. FIG. 24 is a diagram showing a coma aberration at a telephoto end of the projection optical system 3E. FIG. 25 is a diagram showing a spherical aberration, an astigmatism, and a distortion at the wide-angle end of the projection optical system 3E. FIG. 26 is a diagram showing a spherical aberration, an astigmatism, and a distortion at the telephoto end of the projection optical system 3E.

A maximum value of the coma aberration in the projection optical system 3E is as follows.

| | Wide-angle end | Telephoto end |
|---|---|---|
| Maximum value of coma aberration (mm) | 0.0243 | 0.0105 |

As shown in FIGS. 23 to 26, various aberrations are prevented in the projection optical system 3E according to the embodiment. The coma aberration occurring in the projection optical system 3E according to the embodiment is favorably prevented.

SUMMARY OF PRESENT DISCLOSURE

Hereinafter, a summary of the present disclosure will be appended.

APPENDIX 1

A projection optical system includes:

a first lens group; a second lens group; a third lens group; a fourth lens group; a fifth lens group; a sixth lens group; a seventh lens group; an eighth lens group; and a ninth lens group, these lens groups being in an order from a magnification side to a reduction side; and an aperture stop disposed between the second lens group and the eighth lens group, the first lens group has negative power and includes one first aspherical lens, any one of the second lens group, the third lens group, the fourth lens group, the fifth lens group, the sixth lens group, the seventh lens group, the eighth lens group, and the ninth lens group includes at least one second aspherical lens, and during zooming, the first lens group and the ninth lens group are fixed, and the second lens group, the third lens group, the fourth lens group, the fifth lens group, the sixth lens group, the seventh lens group, and the eighth lens group move.

Accordingly, since seven lens groups move during zooming, the projection optical system has a high zoom ratio and a compact total lens length while ensuring sufficient resolution performance over the entire zoom range.

APPENDIX 2

In the projection optical system according to appendix 1, during zooming from a wide-angle end to a telephoto end, the second lens group, the third lens group, the fourth lens group, the fifth lens group, the sixth lens group, the seventh lens group, and the eighth lens group move from the reduction side toward the magnification side.

Accordingly, only the second lens group to the eighth lens group move in the same direction during zooming, and thus a structure of a lens barrel for holding the projection optical system can be simplified.

APPENDIX 3

In the projection optical system according to Appendix 1 or 2, the third lens group and the eighth lens group have positive power.

Accordingly, various aberrations occurring in the first lens group having negative power can be favorably corrected by the third lens group having positive power. Since the eighth lens group has positive power, it is easy to make the reduction side of the projection optical system telecentric.

APPENDIX 4

In the projection optical system according to any one of Appendixes 1 to 3, the aperture stop is disposed between the third lens group and the fourth lens group, between the fourth lens group and the fifth lens group, or between the fifth lens group and the sixth lens group.

APPENDIX 5

In the projection optical system according to Appendix 4, any one of the fourth lens group, the fifth lens group, and the sixth lens group includes the at least one second aspherical lens.

Here, since the second aspherical lens is disposed at a position close to the aperture stop, a width of a light beam passing through the second aspherical lens is small. Therefore, since an effective radius of the second aspherical lens is small, an outer diameter dimension of the second aspherical lens can be reduced. Accordingly, a cost of manufacturing the aspherical lens can be reduced. Since the second aspherical lens is disposed at a position close to the aperture stop, it is easy to favorably improve various aberrations, particularly, a spherical aberration and a coma aberration. Accordingly, optical performance of the projection optical system can be improved.

APPENDIX 6

In the projection optical system according to Appendix 5, none of the second lens group, the third lens group, the seventh lens group, the eighth lens group, and the ninth lens group includes the second aspherical lens. Accordingly, a manufacturing cost can be reduced.

APPENDIX 7

In the projection optical system according to Appendix 5 or 6, the at least one second aspherical lens is one second aspherical lens.

Accordingly, since one second aspherical lens is provided, a manufacturing cost can be reduced as compared with a case where two or more second aspherical lenses are provided. It is easy to dispose each lens when assembling the projection optical system.

APPENDIX 8

In the projection optical system according to any one of Appendixes 1 to 7, $0.1<\Phi 1/\Phi w<1.3$ is satisfied in which $\Phi 1$ is a reciprocal of a composite focal length of all the lenses, which are disposed on the magnification side with respect to the aperture stop, at a wide-angle end, and $\Phi w$ is a reciprocal of a focal length of the entire system at the wide-angle end.

$$0.1 < \Phi 1/\Phi w < 1.3 \quad (1)$$

Accordingly, the projection optical system can favorably correct various aberrations while making a lens length of all the lenses disposed on the magnification side with respect to the aperture stop compact.

APPENDIX 9

In the projection optical system according to any one of Appendixes 1 to 8, $-9.5<Fgs/Fw<0$ is satisfied in which Fgs is a focal length of the lens group that has negative power and that is disposed at a position closest to the aperture stop, and Fw is a focal length of the entire system at a wide-angle end.

$$-9.5 < Fgs/Fw < 0 \quad (2)$$

Accordingly, the projection optical system can prevent occurrence of a field curvature and an astigmatism.

APPENDIX 10

In the projection optical system according to any one of Appendixes 1 to 9, $2.7<(LL/IH)/(Ft/Fw)<4.5$ is satisfied in which Fw is a focal length of the entire system at a wide-angle end, Ft is a focal length of the entire system at a telephoto end, LL is a total lens length, and IH is a maximum image height on the reduction side.

$$2.7 < (LL/IH)/(Ft/Fw) < 4.5 \quad (3)$$

Accordingly, the projection optical system can make the entire system compact while achieving a high zoom ratio.

APPENDIX 11

In the projection optical system according to any one of Appendixes 1 to 10, $-1.0<\Phi g1/\Phi w<-0.5$ is satisfied in which $\Phi w$ is a reciprocal of a focal length of the entire system at a wide-angle end and $\Phi g1$ is a reciprocal of a focal length of the first lens group.

$$-1.0 < \Phi g1/\Phi w < -0.5 \quad (4)$$

Accordingly, the projection optical system can ensure a back focus while favorably correcting various aberrations.

APPENDIX 12

In the projection optical system according to any one of Appendixes 1 to 11, $-0.1<\Phi g2/\Phi w<0.6$ is satisfied in which $\Phi w$ is a reciprocal of a focal length of the entire system at a wide-angle end and $\Phi g2$ is a reciprocal of a focal length of the second lens group.

$$-0.1 < \Phi g2/\Phi w < 0.6 \quad (5)$$

Accordingly, the projection optical system can favorably correct various aberrations while reducing a size thereof.

APPENDIX 13

In the projection optical system according to any one of Appendixes 1 to 12, at least one of the second lens group and the third lens group includes a positive lens having positive power and a negative lens having negative power, and $-0.1<\Phi g2/\Phi g3<1.7$ is satisfied in which $\Phi g2$ is a reciprocal of a focal length of the second lens group and $\Phi g3$ is a reciprocal of a focal length of the third lens group.

$$-0.1 < \Phi g2/\Phi g3 < 1.7 \quad (6)$$

Accordingly, the projection optical system can favorably correct a chromatic aberration and various aberrations.

APPENDIX 14

The projection optical system according to any one of Appendixes 1 to 13, further includes:

a cemented lens that includes a first lens having positive power and a second lens having negative power, and that is disposed on the magnification side with respect to the aperture stop, and $7<|(Nd1\times Vd1)-(Nd2\times Vd2)|<28$ is satisfied in which Nd1 is a refractive index of the first lens, Nd2 is a refractive index of the second lens, Vd1 is an Abbe number of a d-line of the first lens, and Vd2 is an Abbe number of a d-line of the second lens.

$$7 < |(Nd1 \times Vd1) - (Nd2 \times Vd2)| < 28 \quad (7)$$

Accordingly, the projection optical system can favorably correct a chromatic aberration.

APPENDIX 15

In the projection optical system according to Appendix 14, Nd2<1.85 is satisfied in which Nd2 is the refractive index of the second lens.

$$Nd2 < 1.85 \quad (8)$$

Accordingly, the projection optical system can favorably correct a chromatic aberration and reduce a cost of a lens material.

APPENDIX 16

A projector includes:

the projection optical system according to any one of Appendixes 1 to 15; and an image forming element configured to form a projection image on a reduction side conjugate plane of the projection optical system.

What is claimed is:

1. A projection optical system comprising:

a first lens group; a second lens group; a third lens group; a fourth lens group; a fifth lens group; a sixth lens group; a seventh lens group; an eighth lens group; and a ninth lens group, these lens groups being in an order from a magnification side to a reduction side; and an aperture stop disposed between the second lens group and the eighth lens group, wherein the first lens group has negative power and includes one first aspherical lens, any one of the second lens group, the third lens group, the fourth lens group, the fifth lens group, the sixth lens group, the seventh lens group, the eighth lens group, and the ninth lens group includes at least one second aspherical lens, and during zooming, the first lens group and the ninth lens group are fixed, and the second lens group, the third lens group, the fourth lens group, the fifth lens group, the sixth lens group, the seventh lens group, and the eighth lens group move.

2. The projection optical system according to claim 1, wherein during zooming from a wide-angle end to a telephoto end, the second lens group, the third lens group, the fourth lens group, the fifth lens group, the sixth lens group, the seventh lens group, and the eighth lens group move from the reduction side toward the magnification side.

3. The projection optical system according to claim 1, wherein the third lens group and the eighth lens group have positive power.

4. The projection optical system according to claim 1, wherein the aperture stop is disposed between the third lens group and the fourth lens group, between the fourth lens group and the fifth lens group, or between the fifth lens group and the sixth lens group.

5. The projection optical system according to claim 4, wherein any one of the fourth lens group, the fifth lens group, and the sixth lens group includes the at least one second aspherical lens.

6. The projection optical system according to claim 5, wherein none of the second lens group, the third lens group, the seventh lens group, the eighth lens group, and the ninth lens group includes the second aspherical lens.

7. The projection optical system according to claim 5, wherein the at least one second aspherical lens is one second aspherical lens.

8. The projection optical system according to claim 1, wherein 0.1<Φ1/Φw<1.3 is satisfied, wherein Φ1 is a reciprocal of a composite focal length of all the lenses, which are disposed on the magnification side with respect to the aperture stop, at a wide-angle end, and Φw is a reciprocal of a focal length of the entire system at the wide-angle end.

$$0.1 < \Phi 1/\Phi w < 1.3. \quad (1)$$

9. The projection optical system according to claim 1, wherein

−9.5<Fgs/Fw<0 is satisfied, wherein Fgs is a focal length of the lens group that has negative power and that is disposed at a position closest to the aperture stop, and Fw is a focal length of the entire system at a wide-angle end.

$$-9.5 < Fgs/Fw < 0. \quad (2)$$

10. The projection optical system according to claim 1, wherein 2.7<(LL/IH)/(Ft/Fw)<4.5 is satisfied, wherein Fw is a focal length of the entire system at a wide-angle end, Ft is a focal length of the entire system at a telephoto end, LL is a total lens length, and IH is a maximum image height on the reduction side.

$$2.7 < (LL/IH)/(Ft/Fw) < 4.5. \quad (3)$$

11. The projection optical system according to claim 1, wherein

−1.0<Φg1/Φw<−0.5 is satisfied, wherein Φw is a reciprocal of a focal length of the entire system at a wide-angle end and Φg1 is a reciprocal of a focal length of the first lens group.

$$-1.0 < \Phi g1/\Phi w < -0.5. \quad (4)$$

12. The projection optical system according to claim 1, wherein $-0.1<\Phi g2/\Phi w<0.6$ is satisfied, wherein $\Phi w$ is a reciprocal of a focal length of the entire system at a wide-angle end and $\Phi g2$ is a reciprocal of a focal length of the second lens group.

$$-0.1<\Phi g2/\Phi w<0.6. \tag{5}$$

13. The projection optical system according to claim 1, wherein at least one of the second lens group and the third lens group includes a positive lens having positive power and a negative lens having negative power, and $-0.1<\Phi g2/\Phi g3<1.7$ is satisfied, wherein $\Phi g2$ is a reciprocal of a focal length of the second lens group and $\Phi g3$ is a reciprocal of a focal length of the third lens group.

$$-0.1<\Phi g2/\Phi g3<1.7. \tag{6}$$

14. The projection optical system according to claim 1, further comprising:

a cemented lens that includes a first lens having positive power and a second lens having negative power, and that is disposed on the magnification side with respect to the aperture stop, wherein $7<|(Nd1\times Vd1)-(Nd2\times Vd2)|<28$ is satisfied, wherein Nd1 is a refractive index of the first lens, Nd2 is a refractive index of the second lens, Vd1 is an Abbe number of a d-line of the first lens, and Vd2 is an Abbe number of a d-line of the second lens.

$$7<|(Nd1\times Vd1)-(Nd2\times Vd2)|<28. \tag{7}$$

15. The projection optical system according to claim 14, wherein $Nd2<1.85$ is satisfied, wherein Nd2 is the refractive index of the second lens.

$$Nd2<1.85. \tag{8}$$

16. A projector comprising:

the projection optical system according to claim 1; and an image forming element configured to form a projection image on a reduction side conjugate plane of the projection optical system.

* * * * *